(12) United States Patent
Sinchok

(10) Patent No.: US 11,142,053 B2
(45) Date of Patent: Oct. 12, 2021

(54) ARTICLE AND METHOD OF MANUFACTURE OF TRUCK CAP

(71) Applicant: John Sinchok Design, LLC, Hudson, OH (US)

(72) Inventor: John Sinchok, Hudson, OH (US)

(73) Assignee: John Sinchok Design, LLC, Hudson, OH (US)

( * ) Notice: Subject to any disclaimer, the term of this patent is extended or adjusted under 35 U.S.C. 154(b) by 19 days.

(21) Appl. No.: 16/712,381

(22) Filed: Dec. 12, 2019

(65) Prior Publication Data
US 2021/0178875 A1  Jun. 17, 2021

(51) Int. Cl.
*B60J 7/14* (2006.01)
*B60J 7/19* (2006.01)

(52) U.S. Cl.
CPC ............. *B60J 7/141* (2013.01); *B60J 7/198* (2013.01)

(58) Field of Classification Search
CPC ....... B60J 7/12; B60J 7/14; B60J 7/141; B60J 7/16; B60J 7/1607; B60J 7/1621; B60J 7/198
USPC .......................... 296/100.02, 100.06, 100.07
See application file for complete search history.

(56) References Cited

U.S. PATENT DOCUMENTS

| | | | | |
|---|---|---|---|---|
| 3,069,199 A * | 12/1962 | Reardon | ................ | B62D 33/04 296/100.07 |
| 4,126,349 A * | 11/1978 | Nelson | .................... | B60R 11/00 224/404 |
| 4,531,775 A * | 7/1985 | Beals | ................. | B62D 33/0273 108/12 |
| 6,254,169 B1 * | 7/2001 | Arthur | ................... | B60J 7/1621 296/100.04 |
| 6,598,930 B1 * | 7/2003 | Tilton | ..................... | B60J 7/141 296/100.06 |
| 6,607,229 B1 * | 8/2003 | McIntosh | ............... | B60J 7/1621 296/100.07 |
| 6,663,160 B2 * | 12/2003 | Yarbrough | ............... | B60J 7/141 296/100.01 |
| 8,764,094 B1 * | 7/2014 | Castillo | .................... | B60P 7/02 296/100.08 |
| 8,794,690 B1 * | 8/2014 | Al-Saeed | ............... | B60J 7/1621 296/100.1 |
| 9,713,950 B1 * | 7/2017 | Stoddard, Jr. | .......... | B62D 33/03 |
| 2007/0210608 A1 * | 9/2007 | Klein | .................... | B60J 7/1621 296/100.02 |
| 2008/0129067 A1 * | 6/2008 | Rios | ......................... | B60P 3/40 296/3 |
| 2014/0191531 A1 * | 7/2014 | Castillo | .................... | B60P 7/02 296/100.02 |
| 2019/0283811 A1 * | 9/2019 | Fisher | .................. | B62D 33/027 |

* cited by examiner

*Primary Examiner* — Jason S Daniels
(74) *Attorney, Agent, or Firm* — Emerson, Thomson & Bennett, LLC; Roger D. Emerson

(57) ABSTRACT

An innovative article and manufacturing method therefore. The article is a truck cap which may be selectively assembled and mounted to an associated pickup truck bed by a single person. The article features two primary members which can be selectively opened or closed to carry cargo. The article includes a locking mechanism which enables the contents of the truck bed to be safely locked and secured.

3 Claims, 35 Drawing Sheets

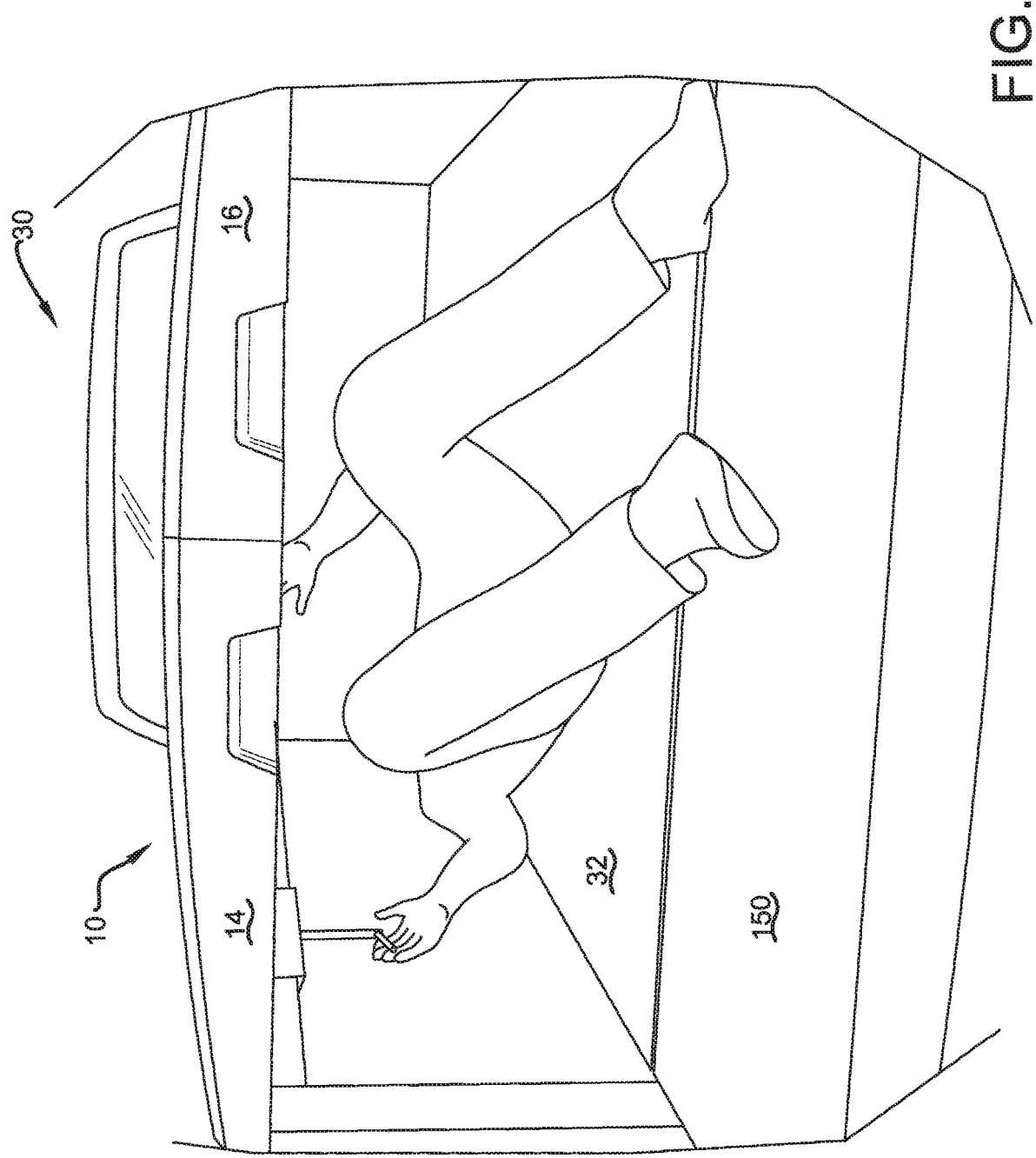

ARTICLE AND METHOD OF MANUFACTURE OF TRUCK CAP

I. BACKGROUND

This invention pertains to articles and methods of manufacture for those articles whereby the article covers the bed portion of a pickup truck or like vehicle. Specifically, the disclosed method of manufacturing article is an rotationally-molded article where essentially two halves fit together to cover the bed of an associated vehicle, such as a pickup truck.

II. SUMMARY

In accordance with one aspect of the present invention, an article is disclosed which essentially comprises two planar members which nest together to selectively cover the bed of an associated pickup truck.

In accordance with another aspect of the present invention, the first and second members are rotationally molded.

In accordance with still another aspect of the present invention, the first and second members are essentially a mirror image of each other, so that a single mold can be used to produce both first and second members, which then nest together to selectively cover an associated truck bed.

In accordance with yet another aspect of the present invention, support struts assist in the opening of the first and second members.

In accordance with yet another aspect of the present invention, a locking mechanism and method using same can be used to lock the first and second members, and thereby generally secure the contents of the associated truck bed.

Still other benefits and advantages of the invention will become apparent to those skilled in the art to which it pertains upon a reading and understanding of the following detailed specification.

III. BRIEF DESCRIPTION OF THE DRAWINGS

The invention may take physical form in certain parts and arrangement of parts, embodiments of which will be described in detail in this specification and illustrated in the accompanying drawings which form a part hereof and wherein.

Figure 6:
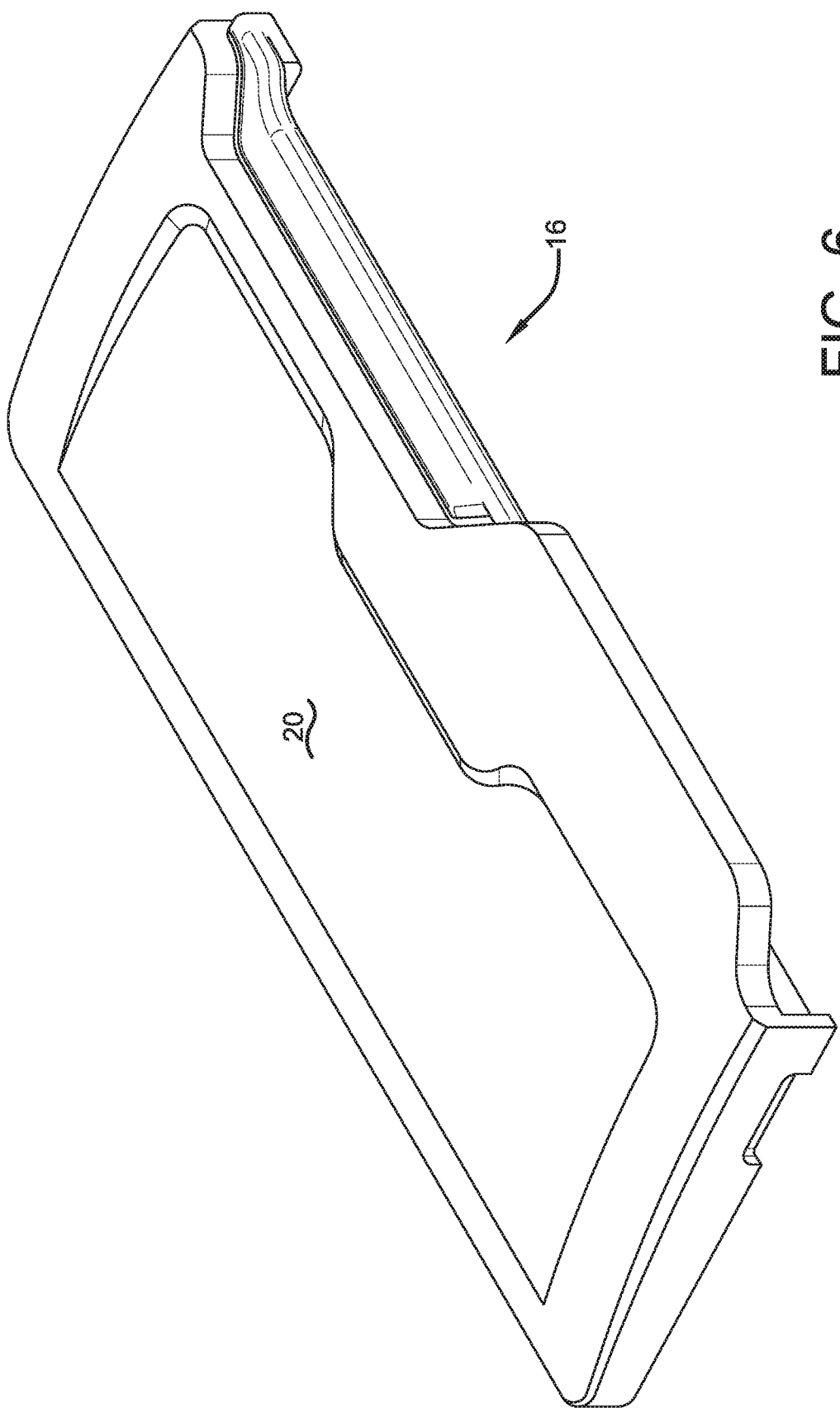
Figure 7:
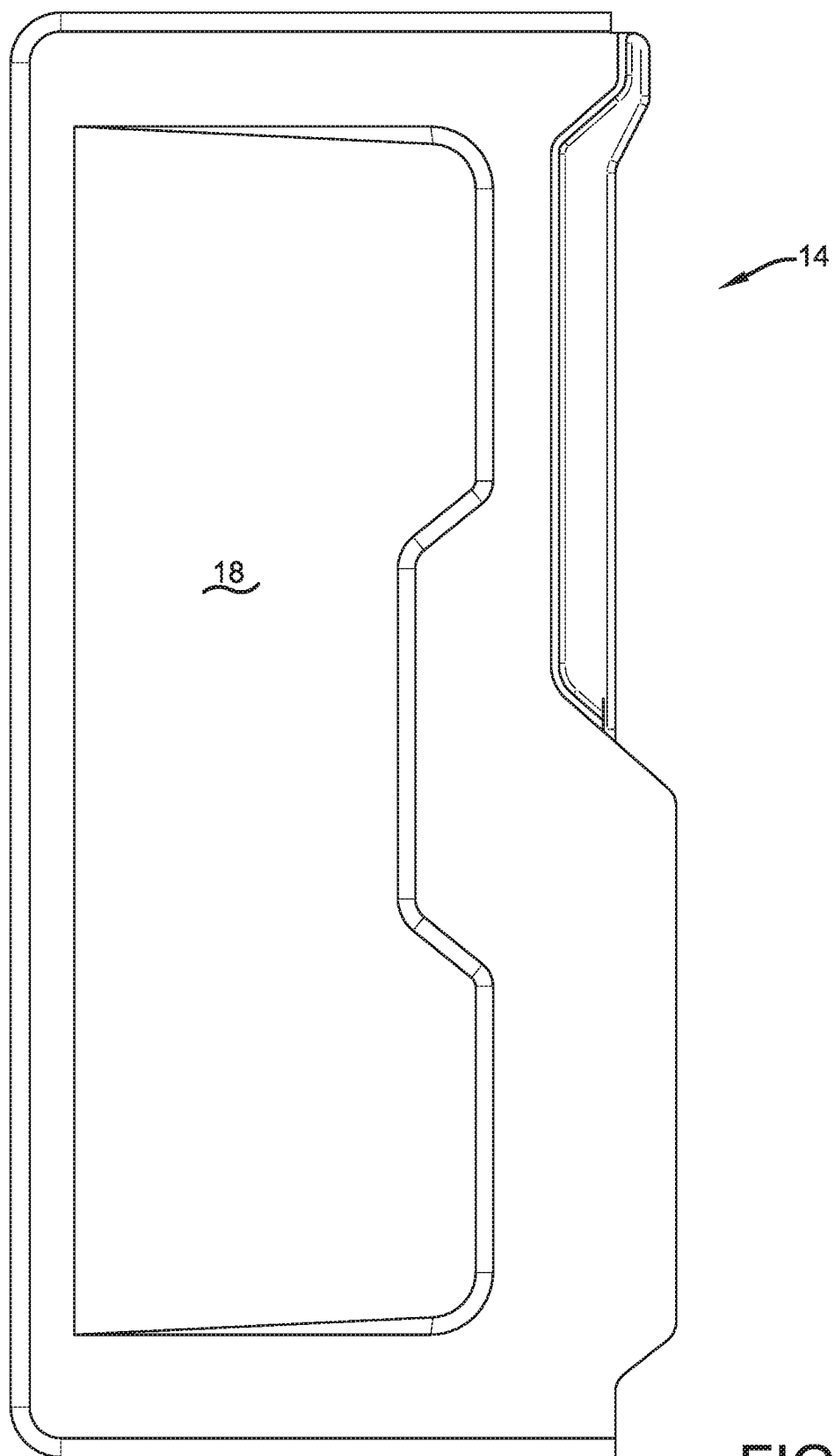
Figure 8:
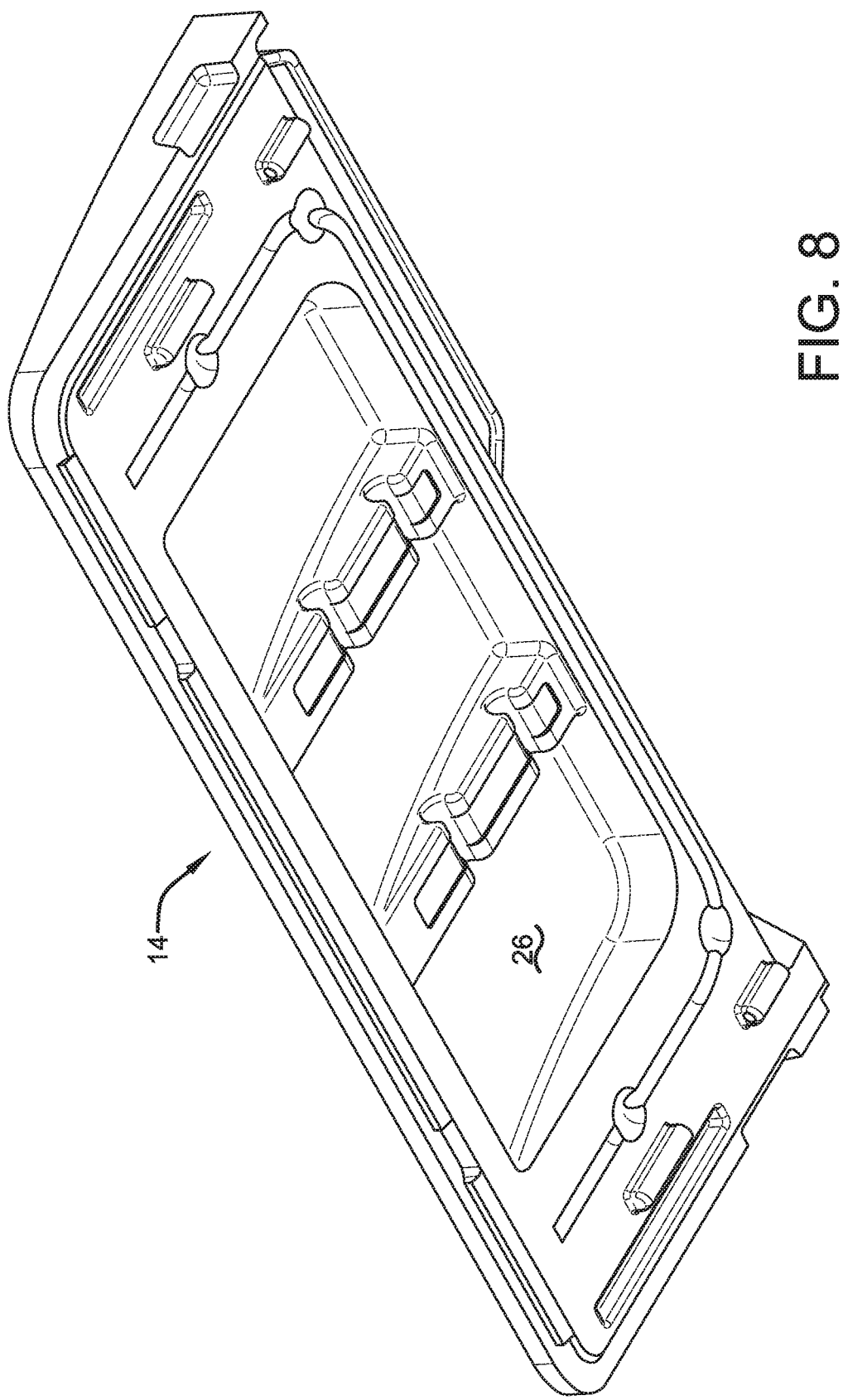
Figure 9:
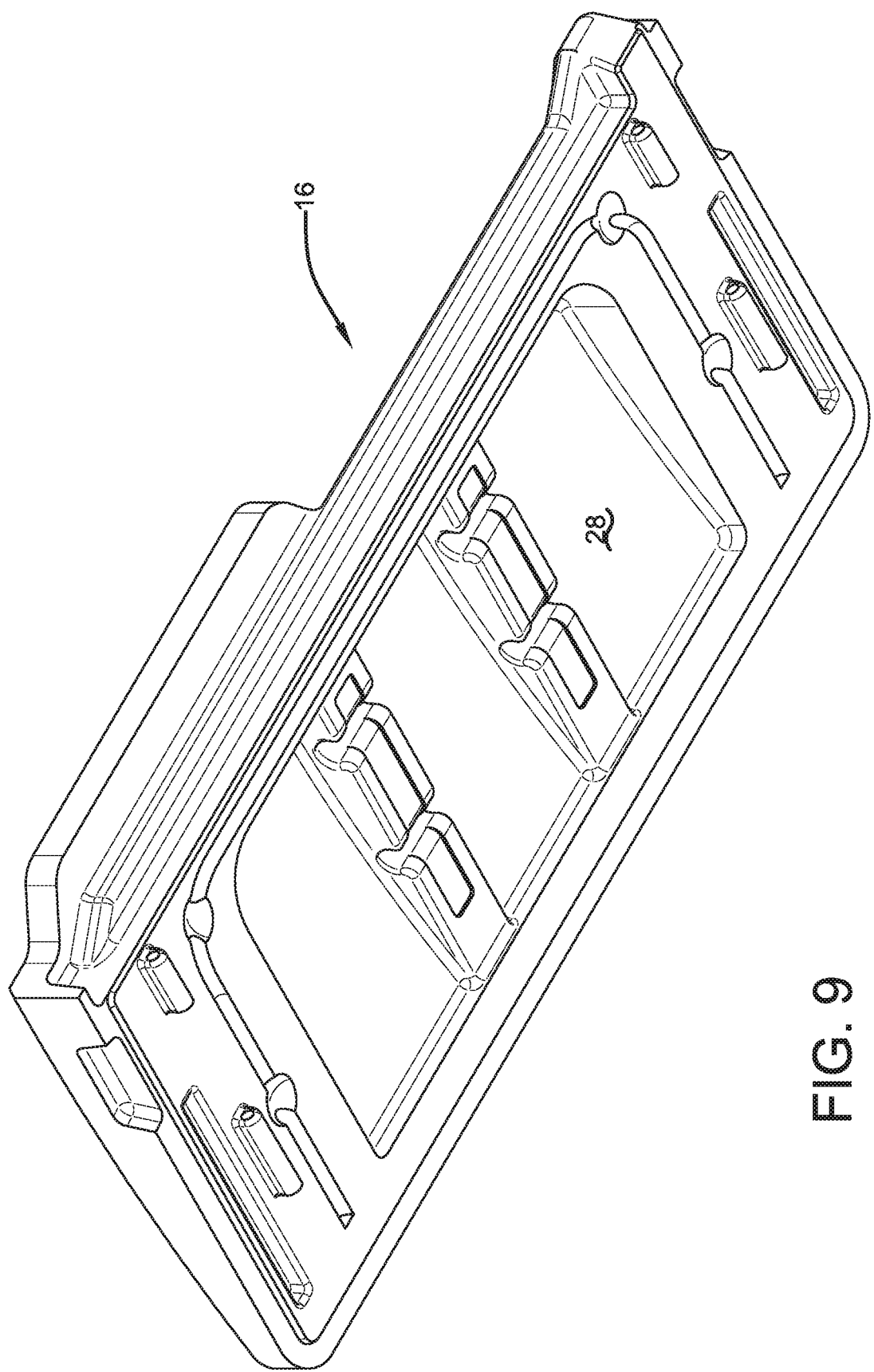
Figure 10:
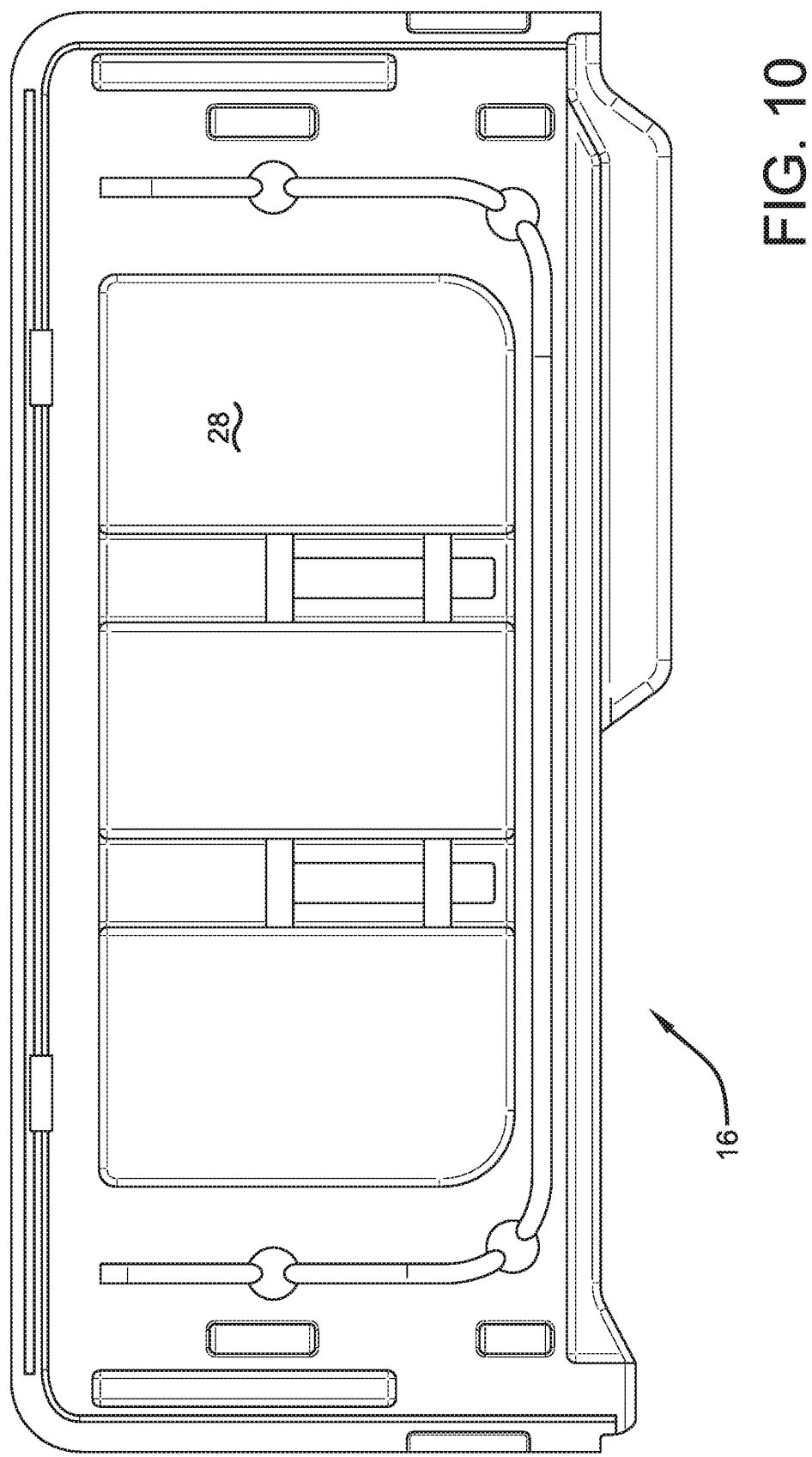
Figure 11:
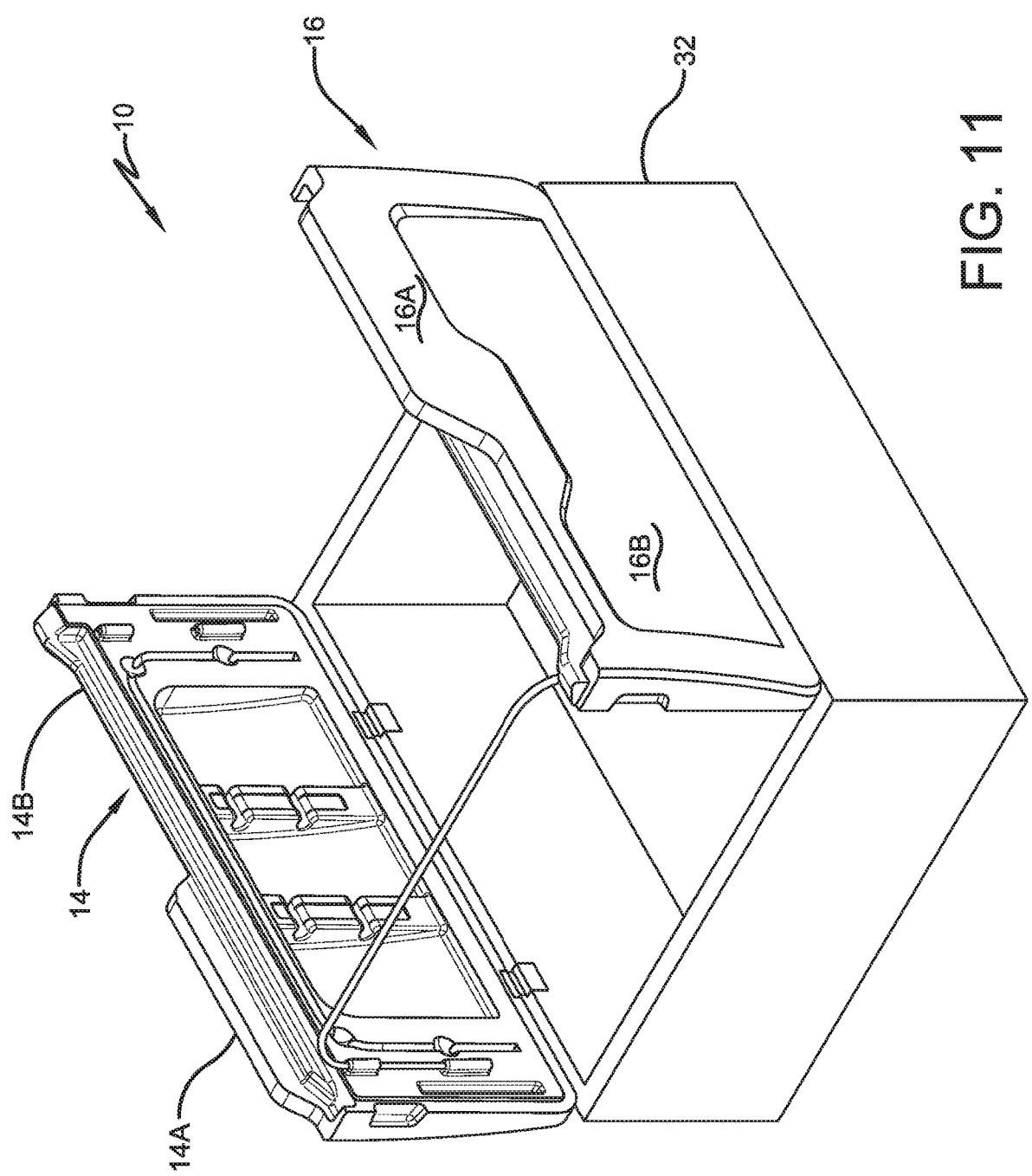
Figure 12:
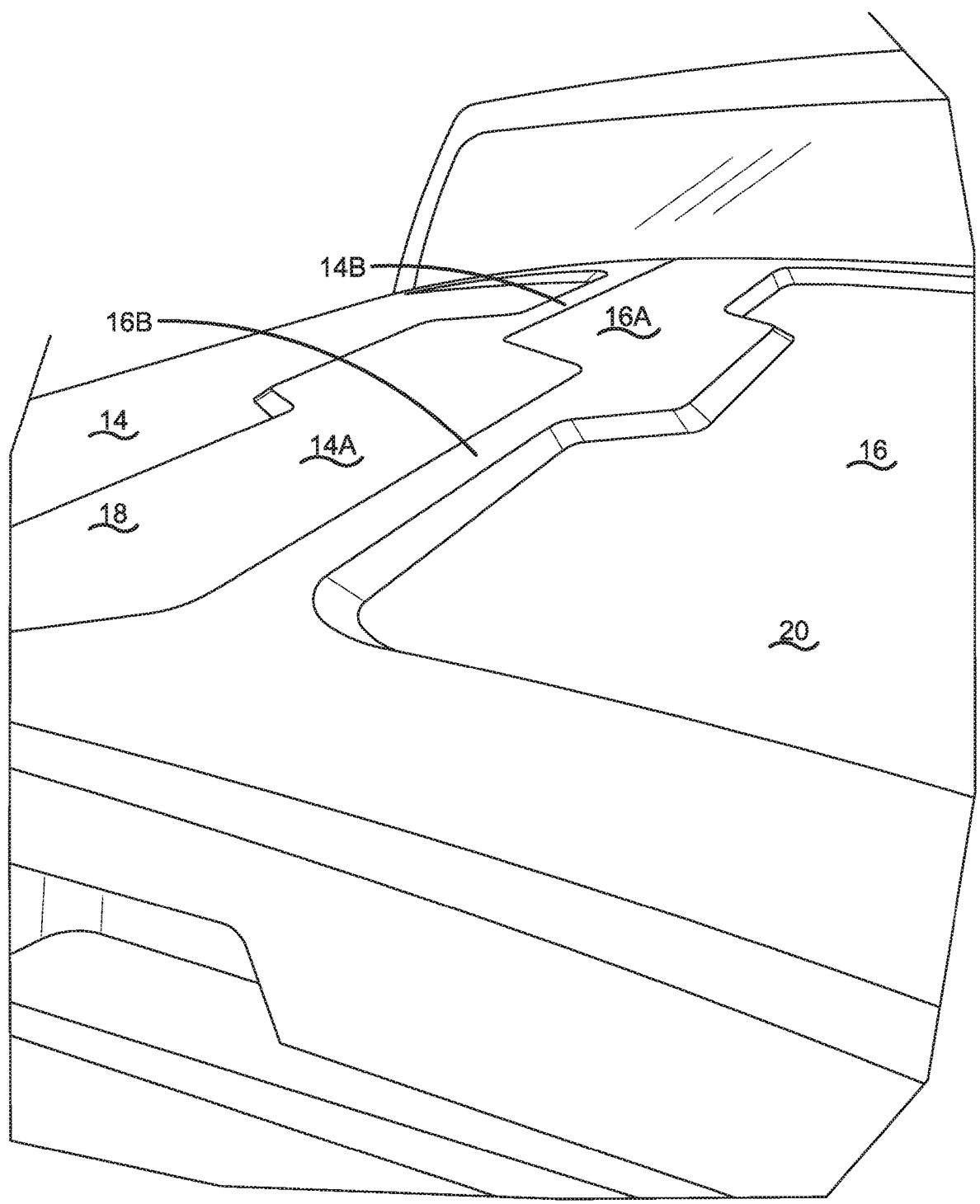
Figure 13:
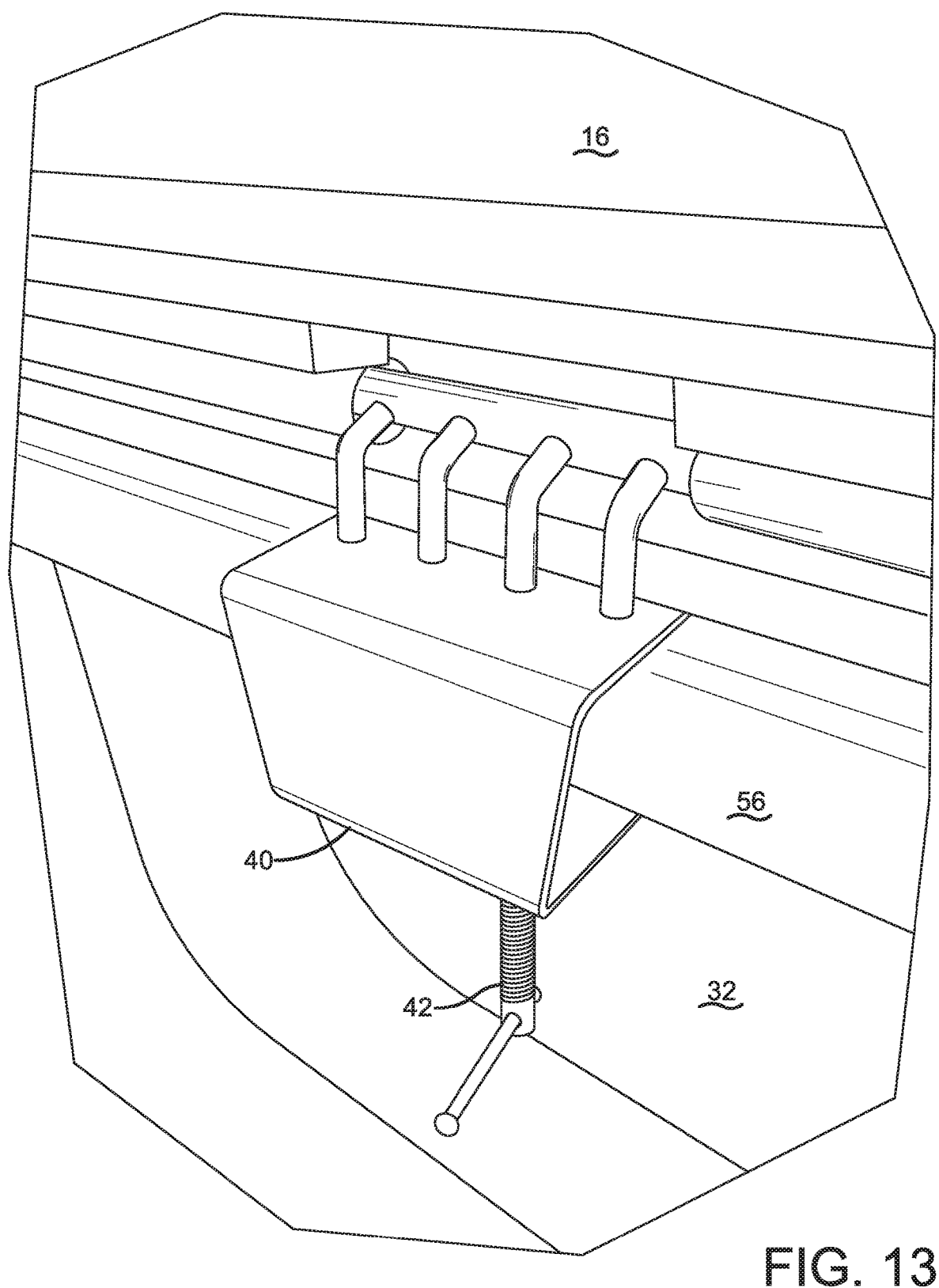
Figure 14:
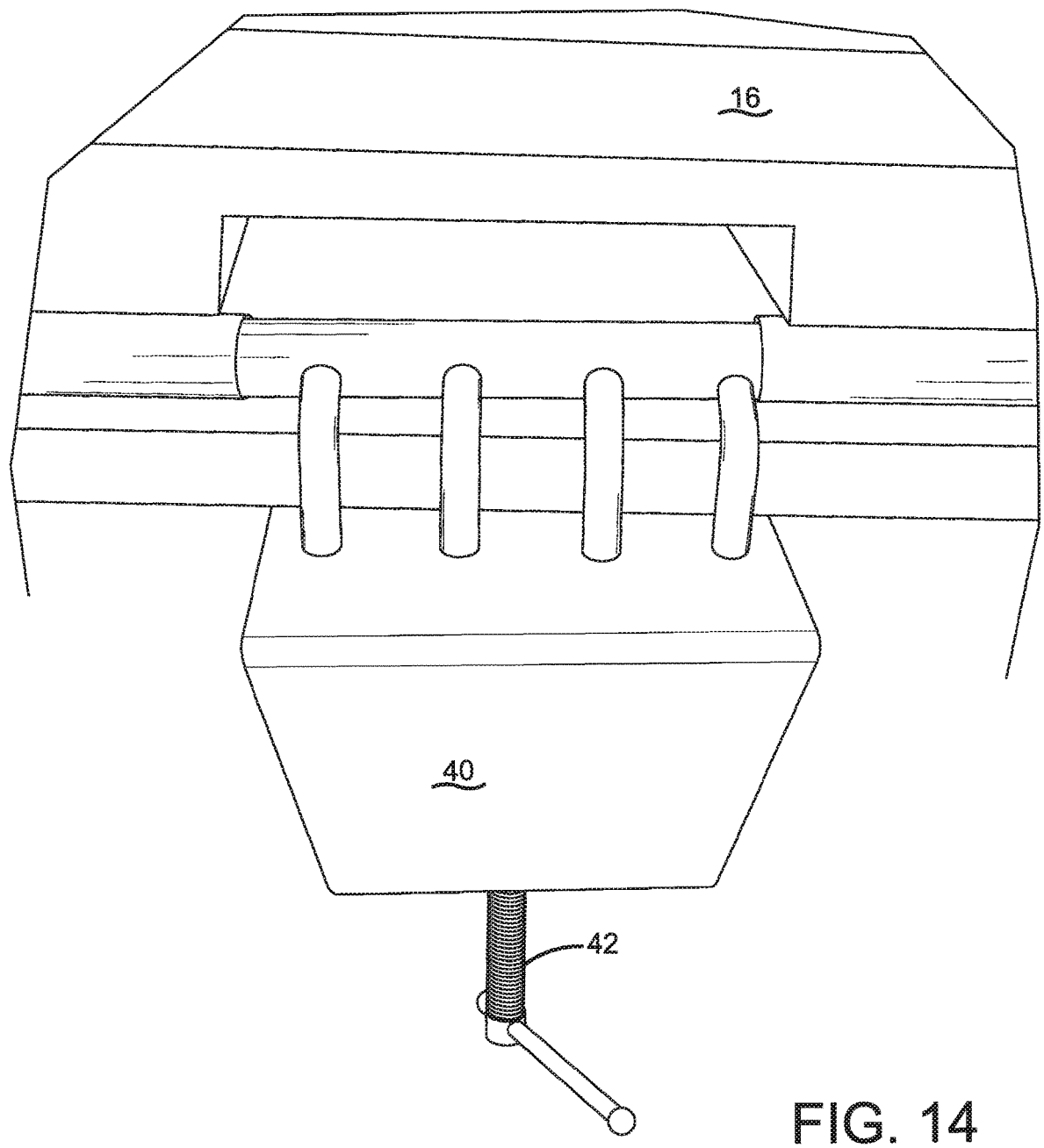
Figure 15:
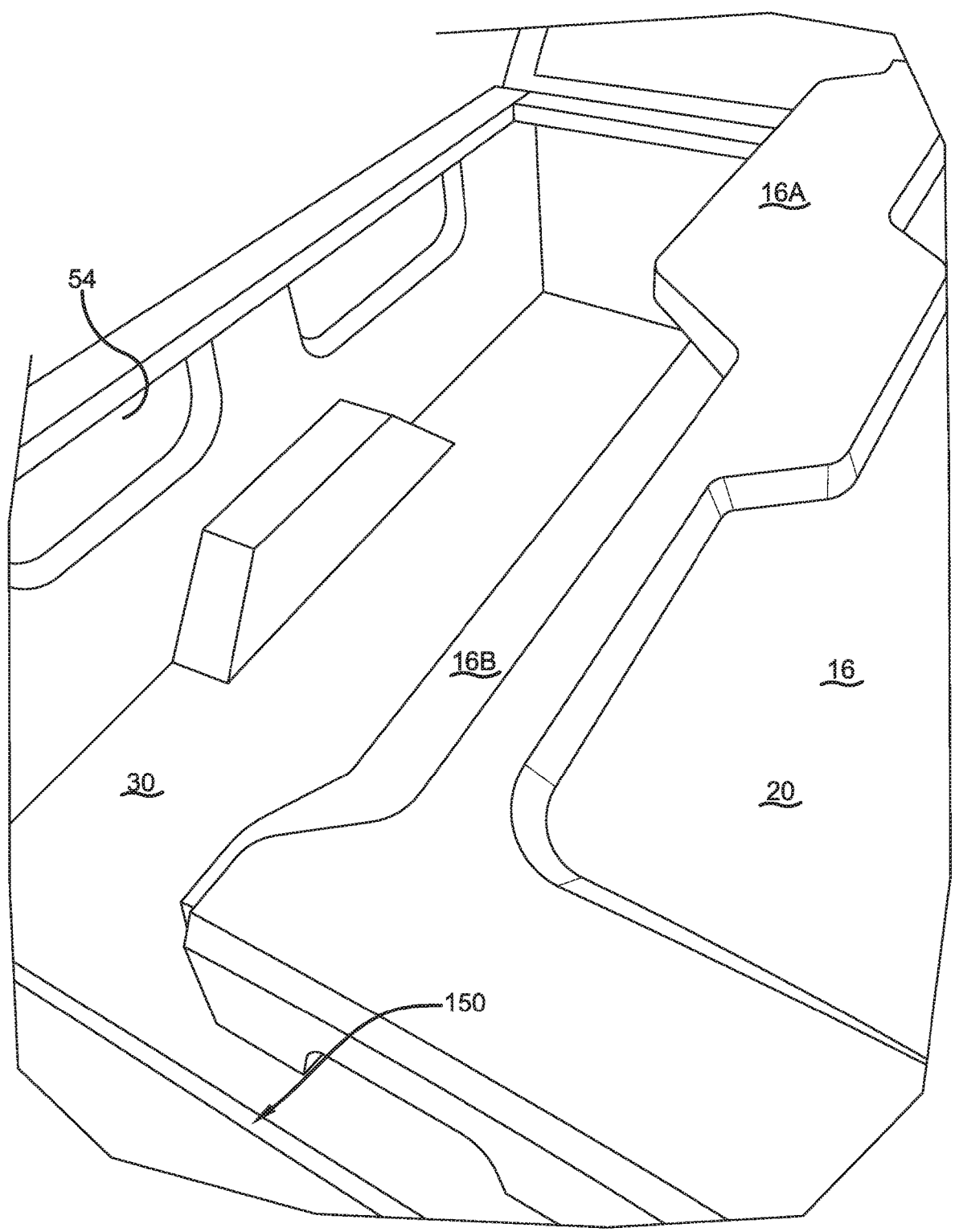
Figure 16:
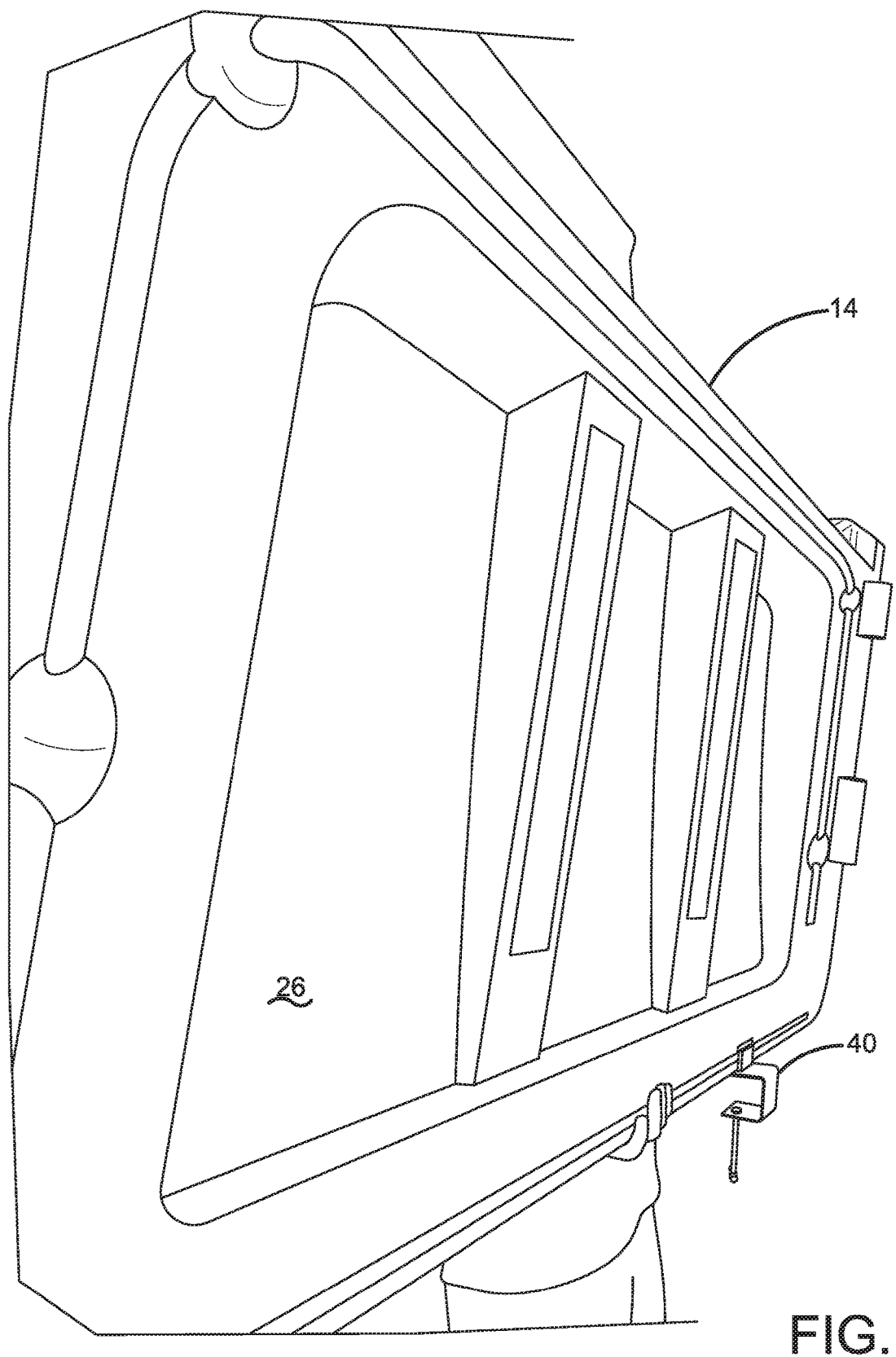
Figure 17:
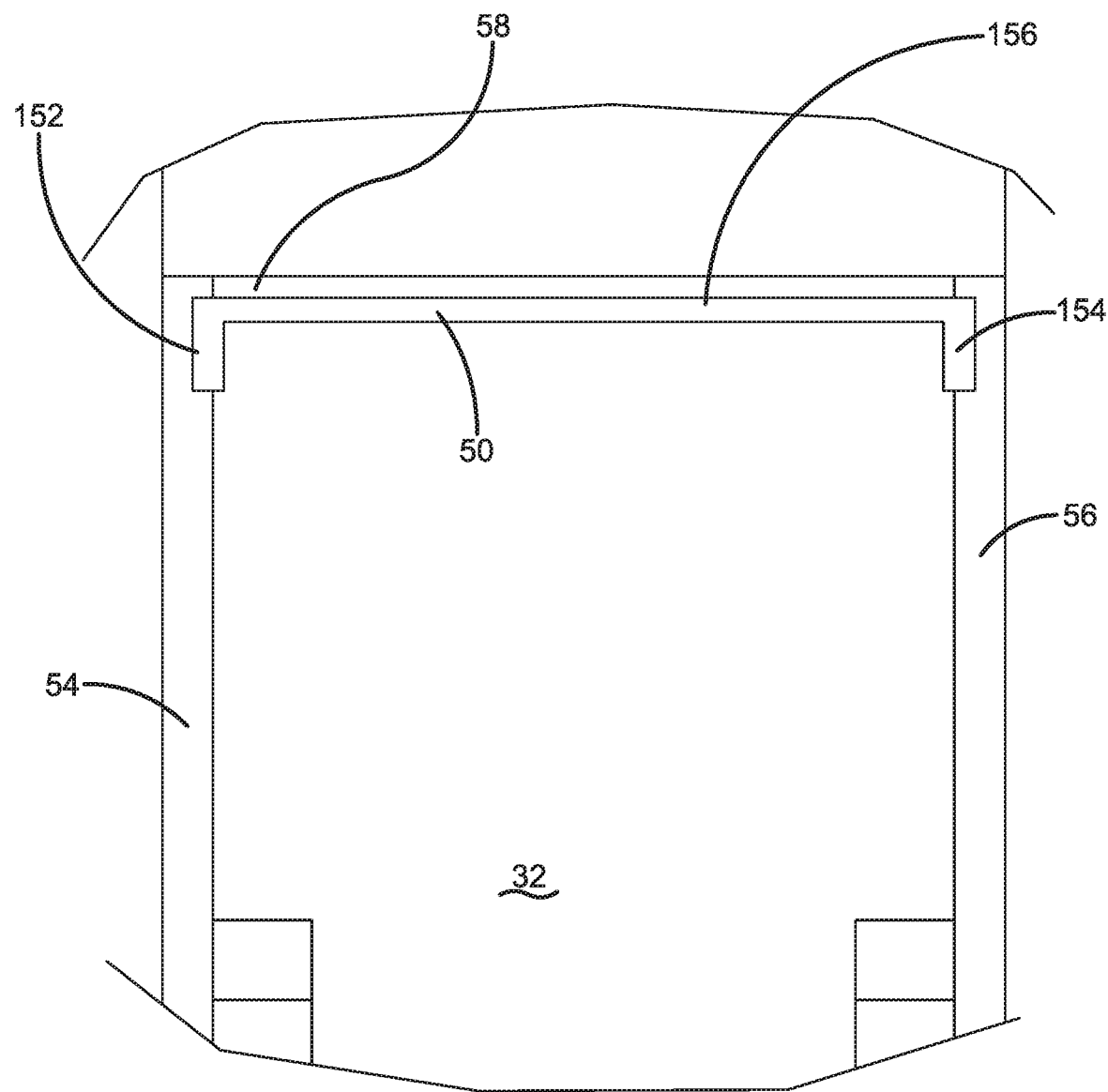
Figure 18:
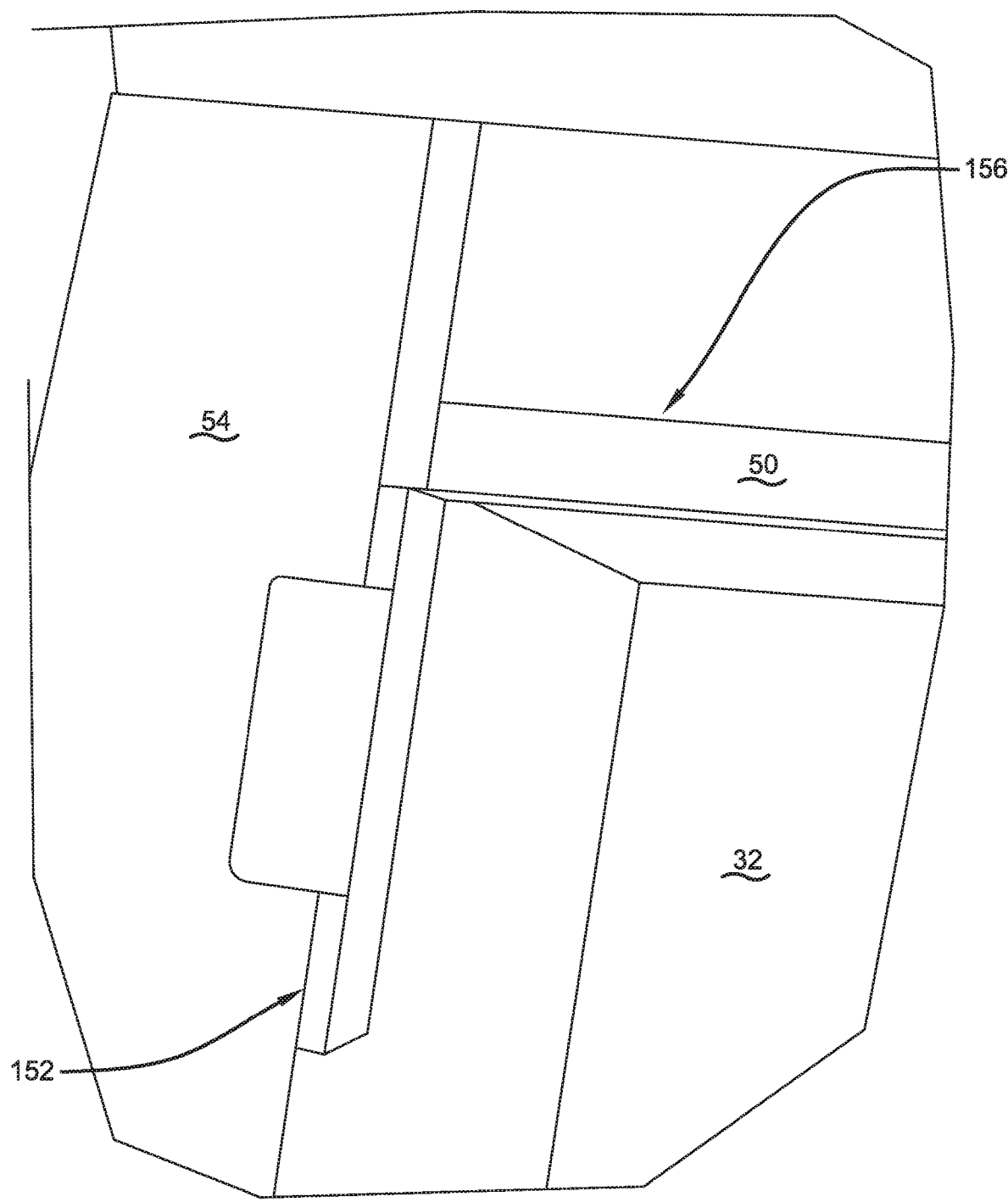
Figure 19:
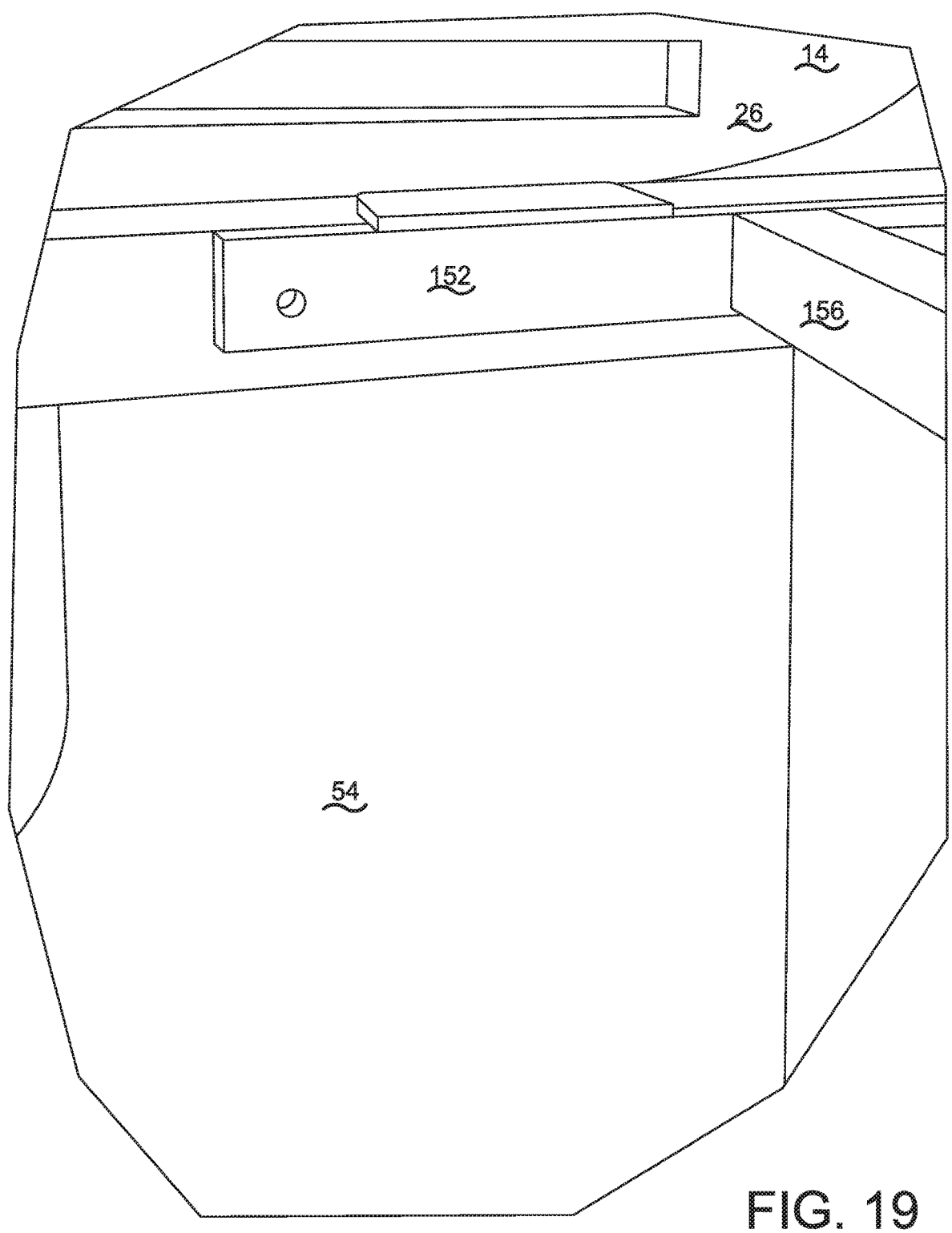
Figure 20:
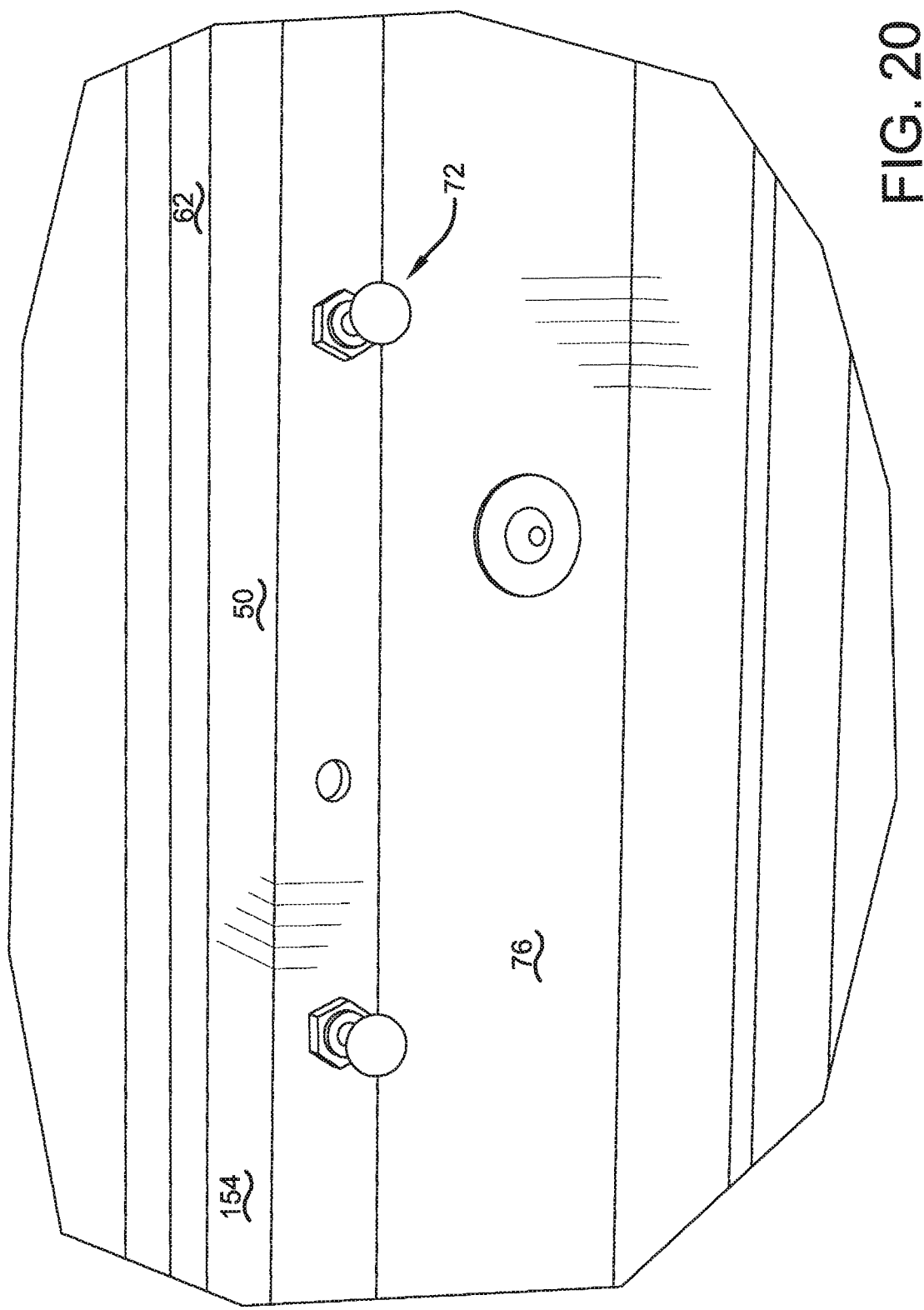
Figure 21:
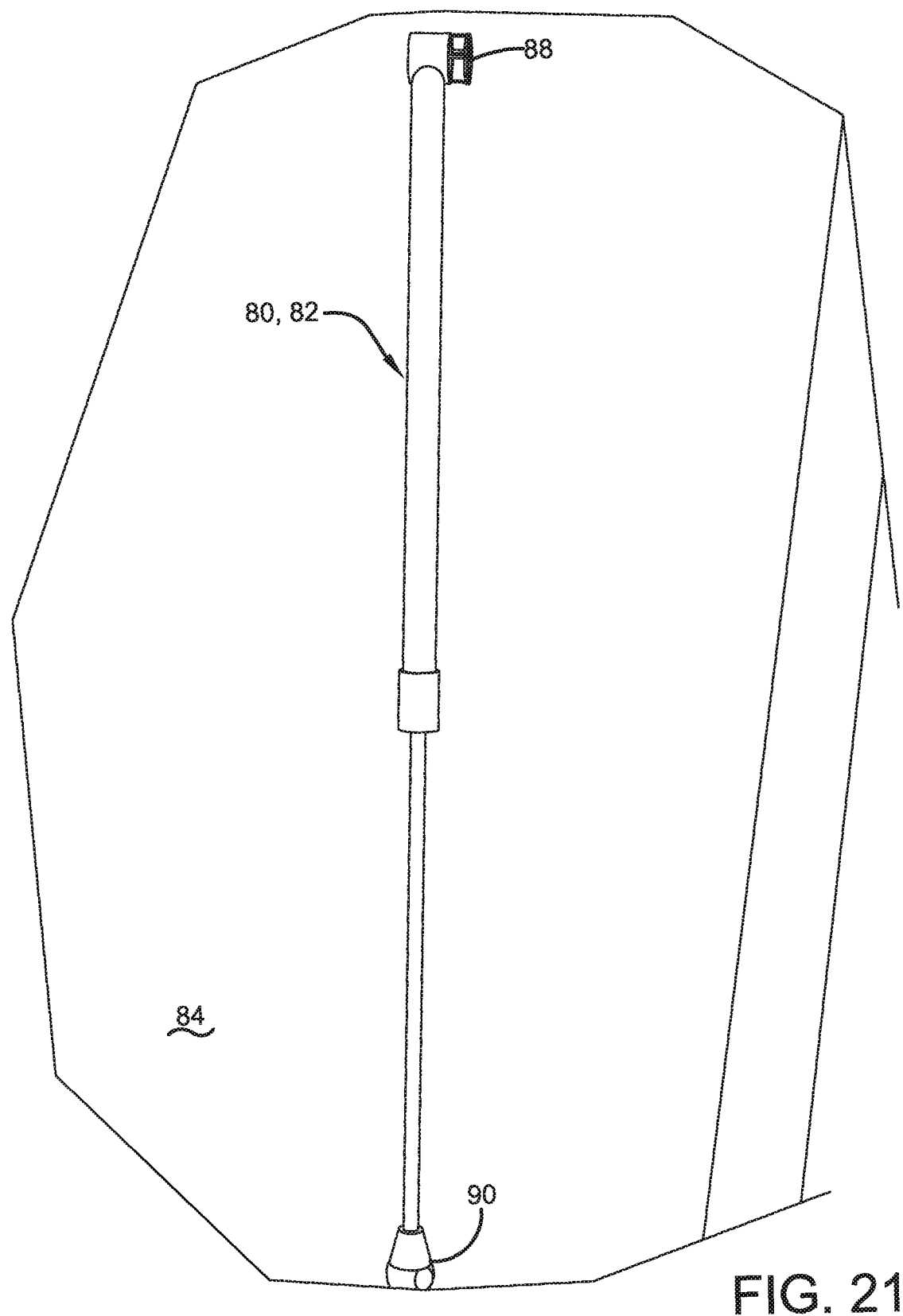
Figure 22:
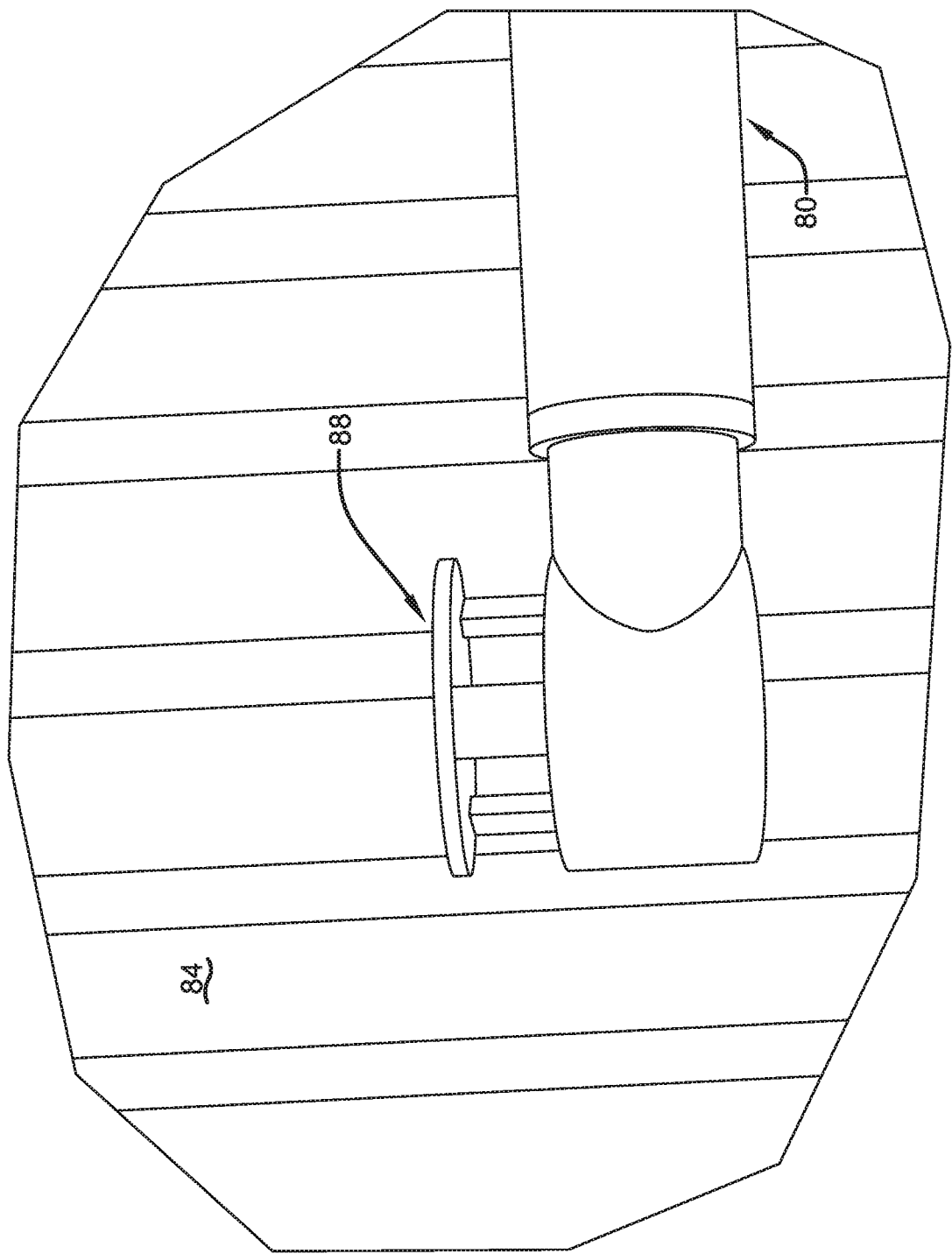
Figure 23:
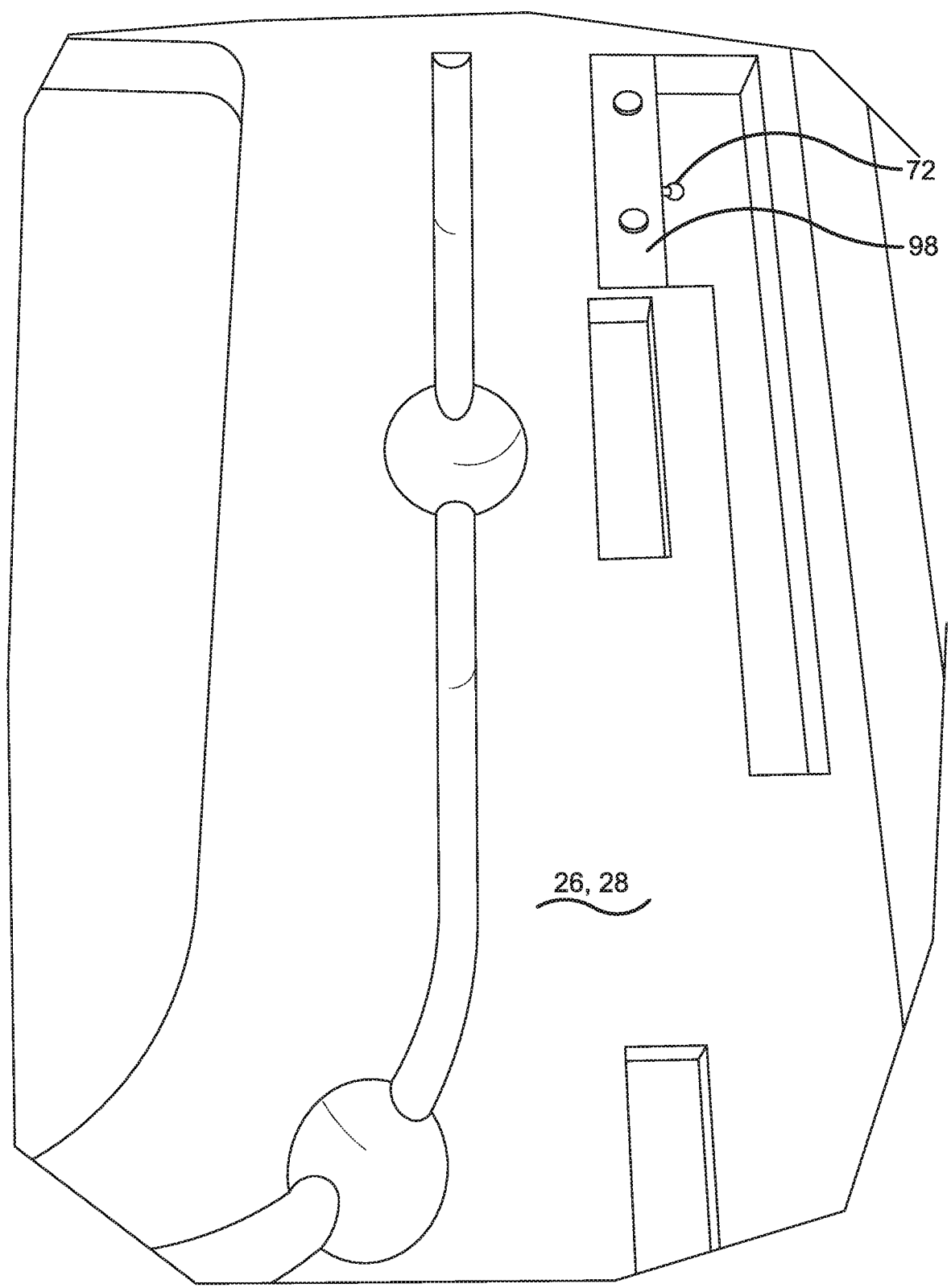
Figure 24:
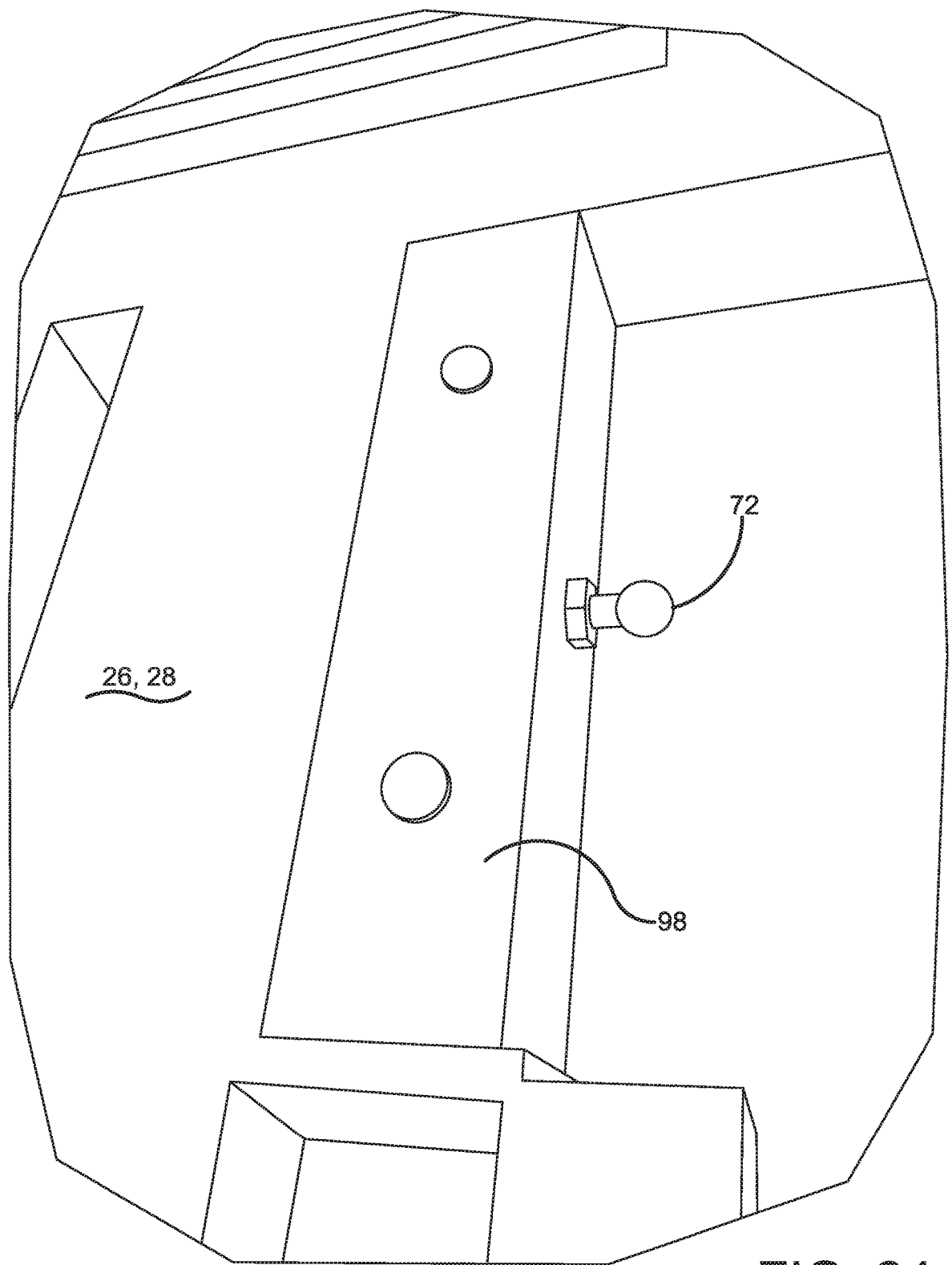
Figure 25:
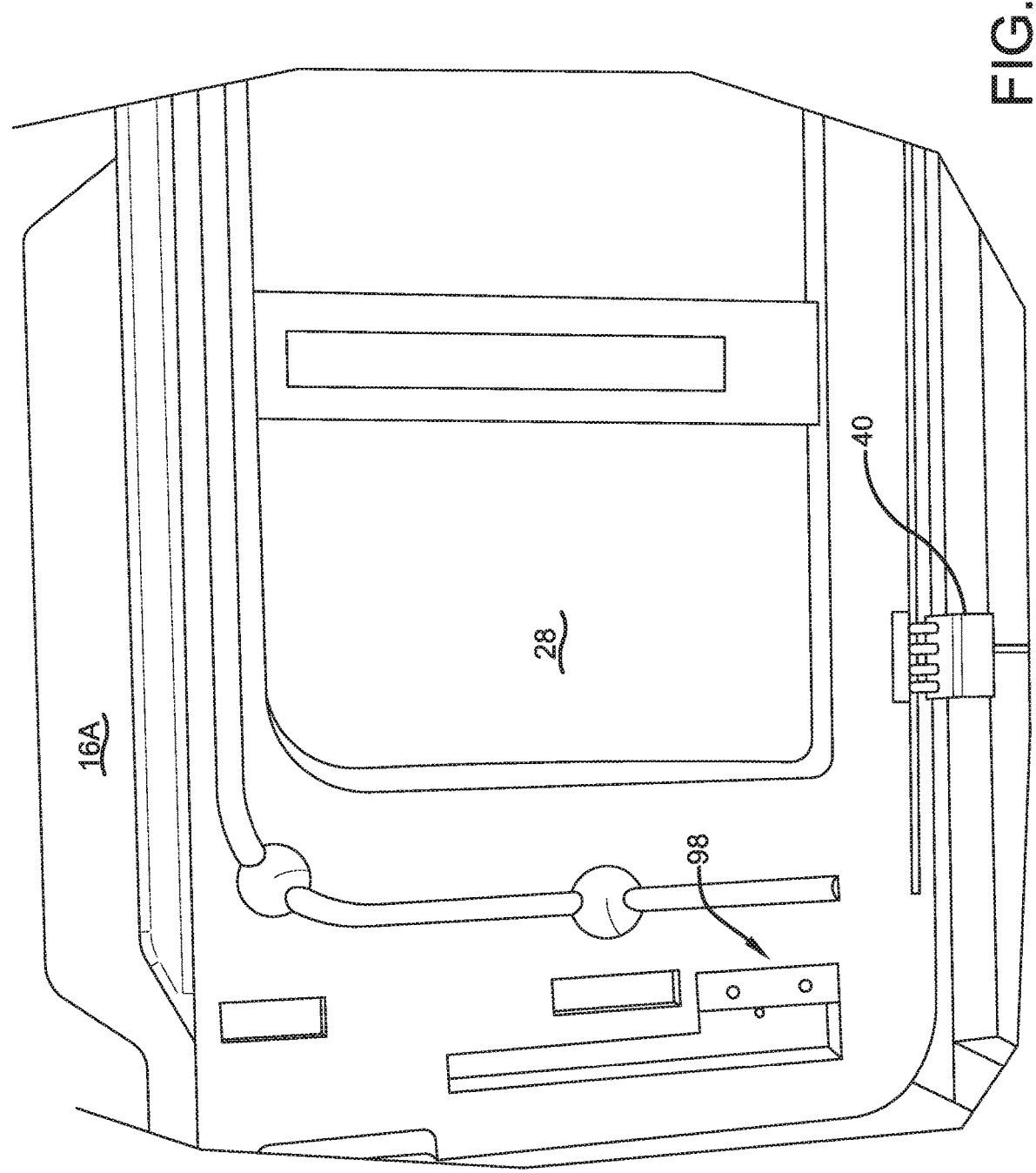
Figure 26:
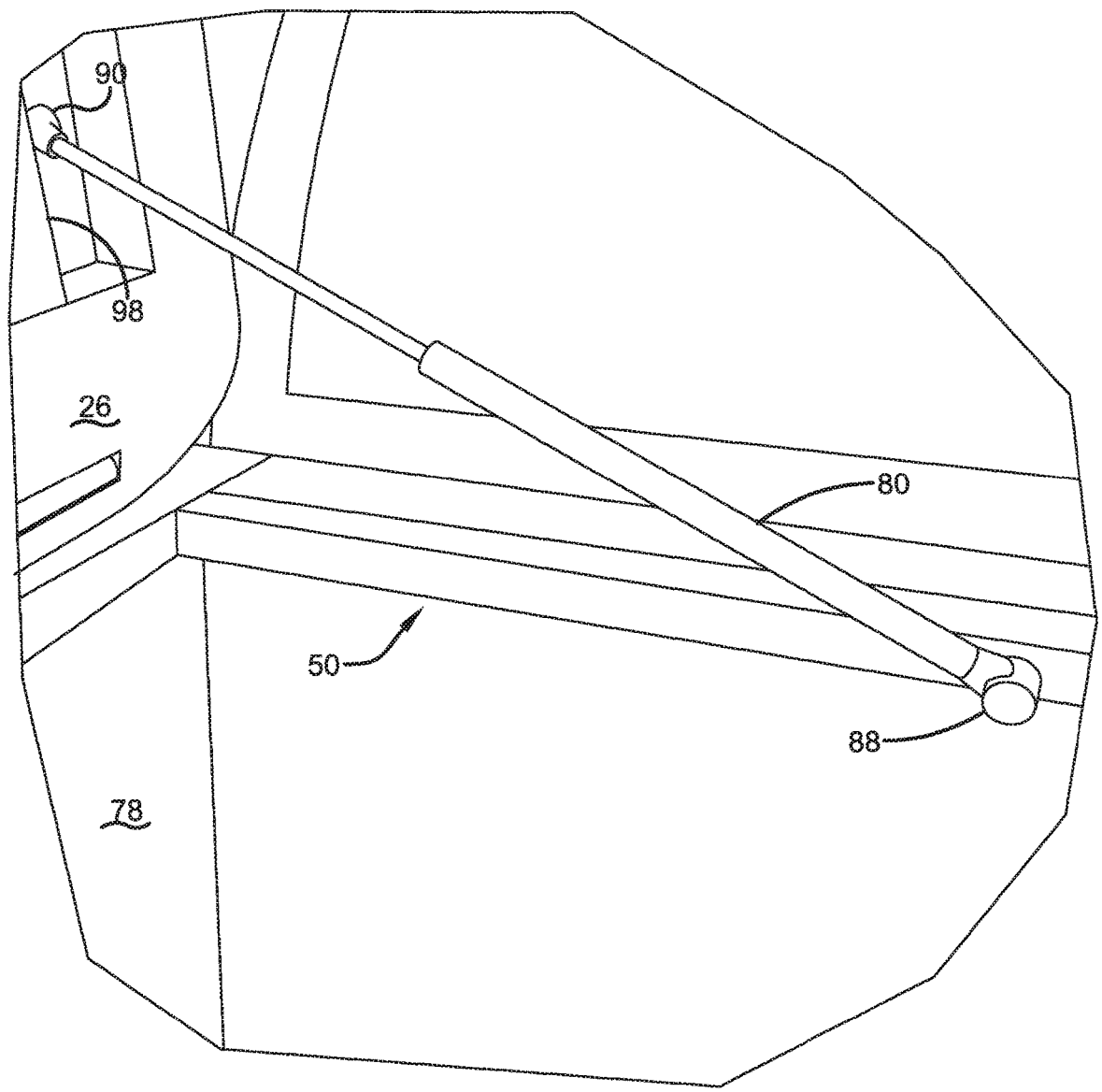
Figure 27:
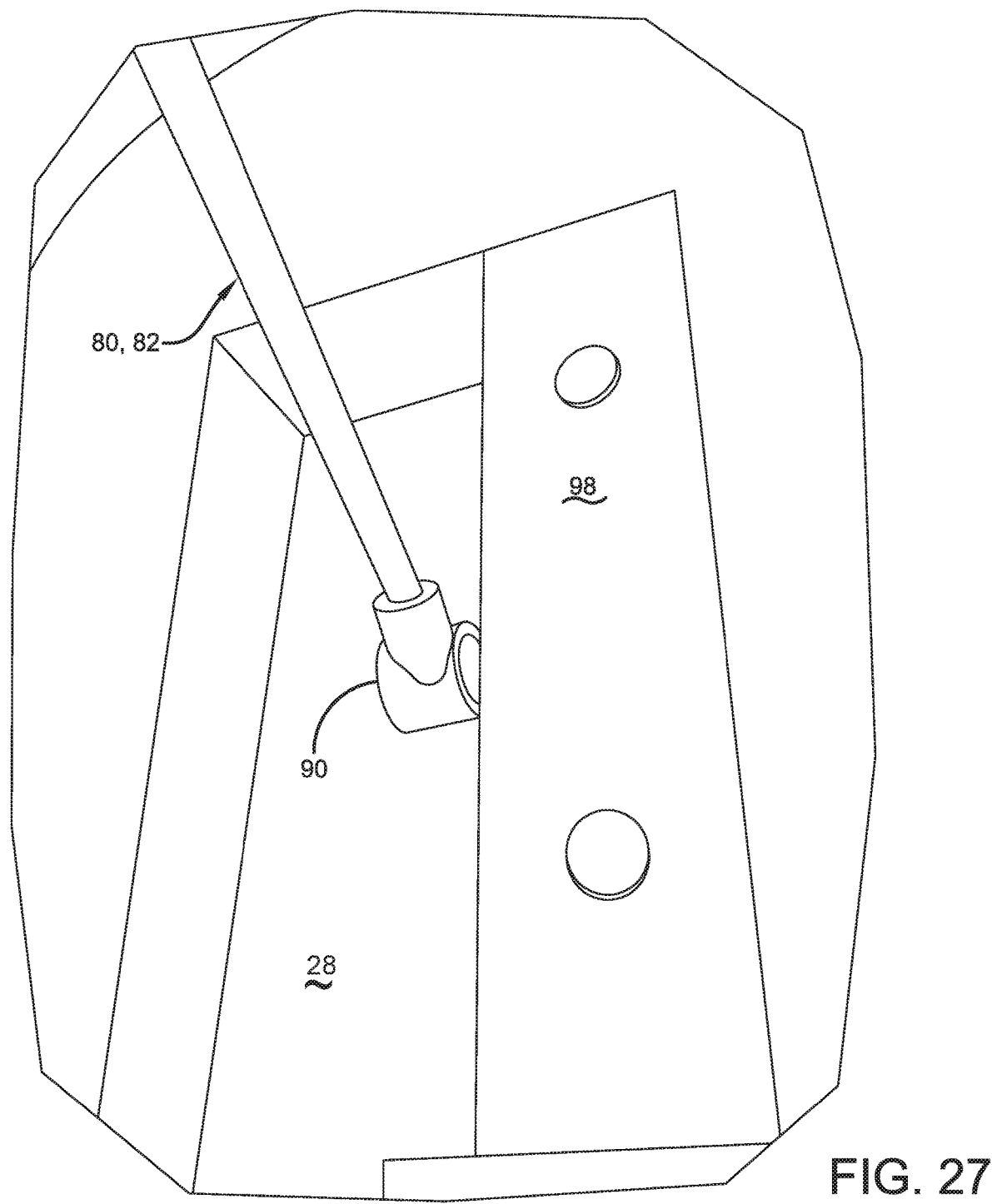
Figure 28:
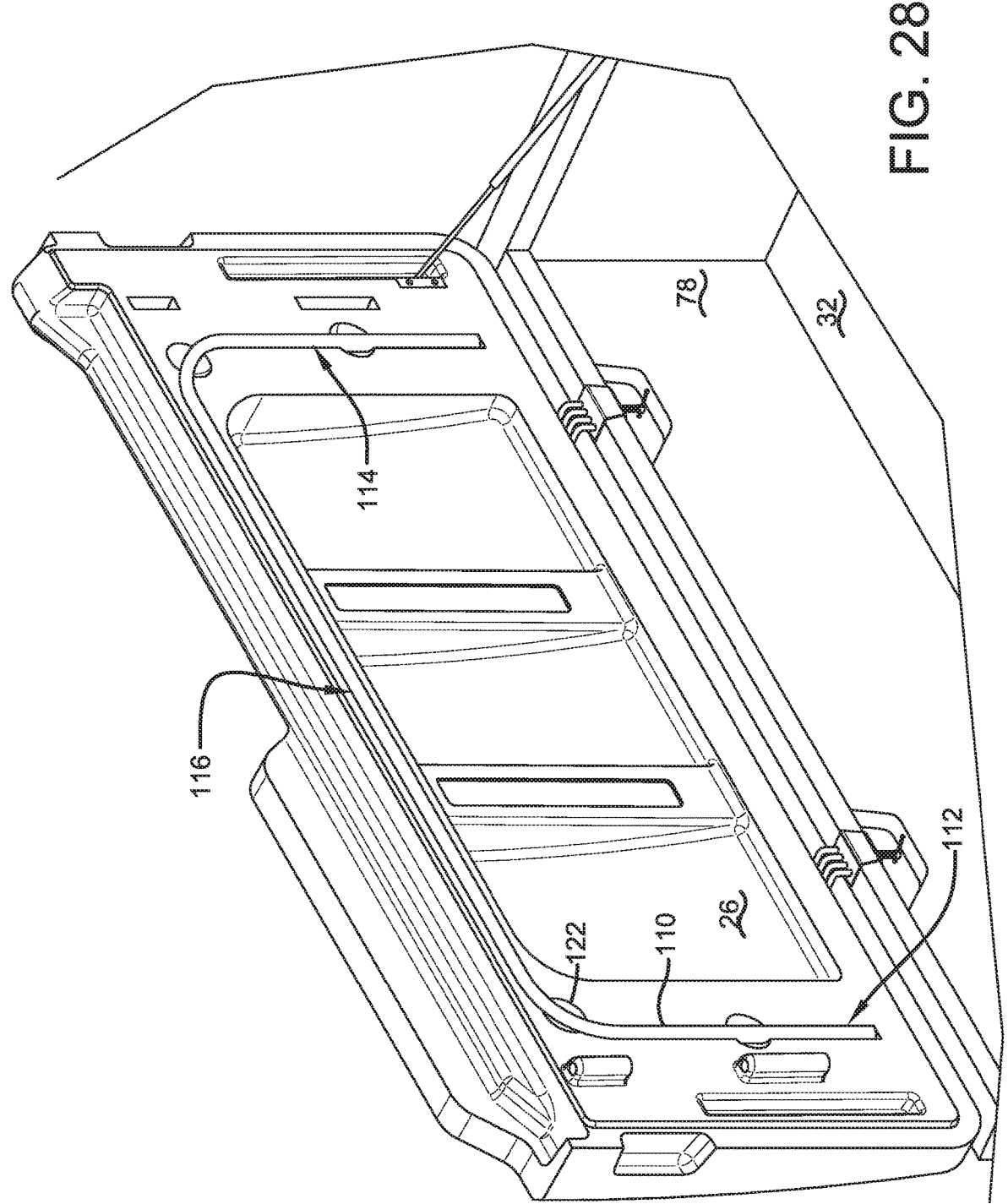
Figure 29:
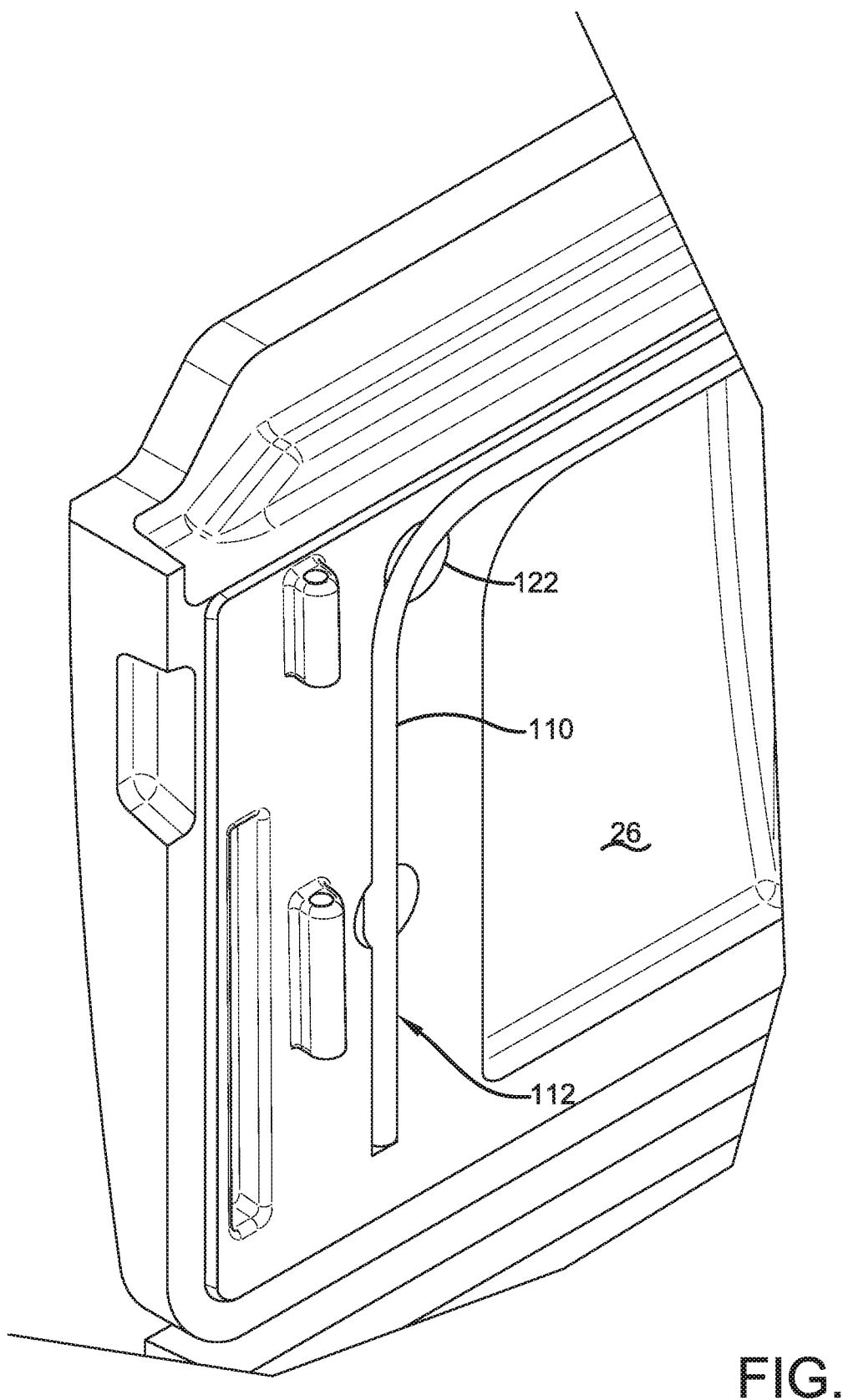
Figure 30:
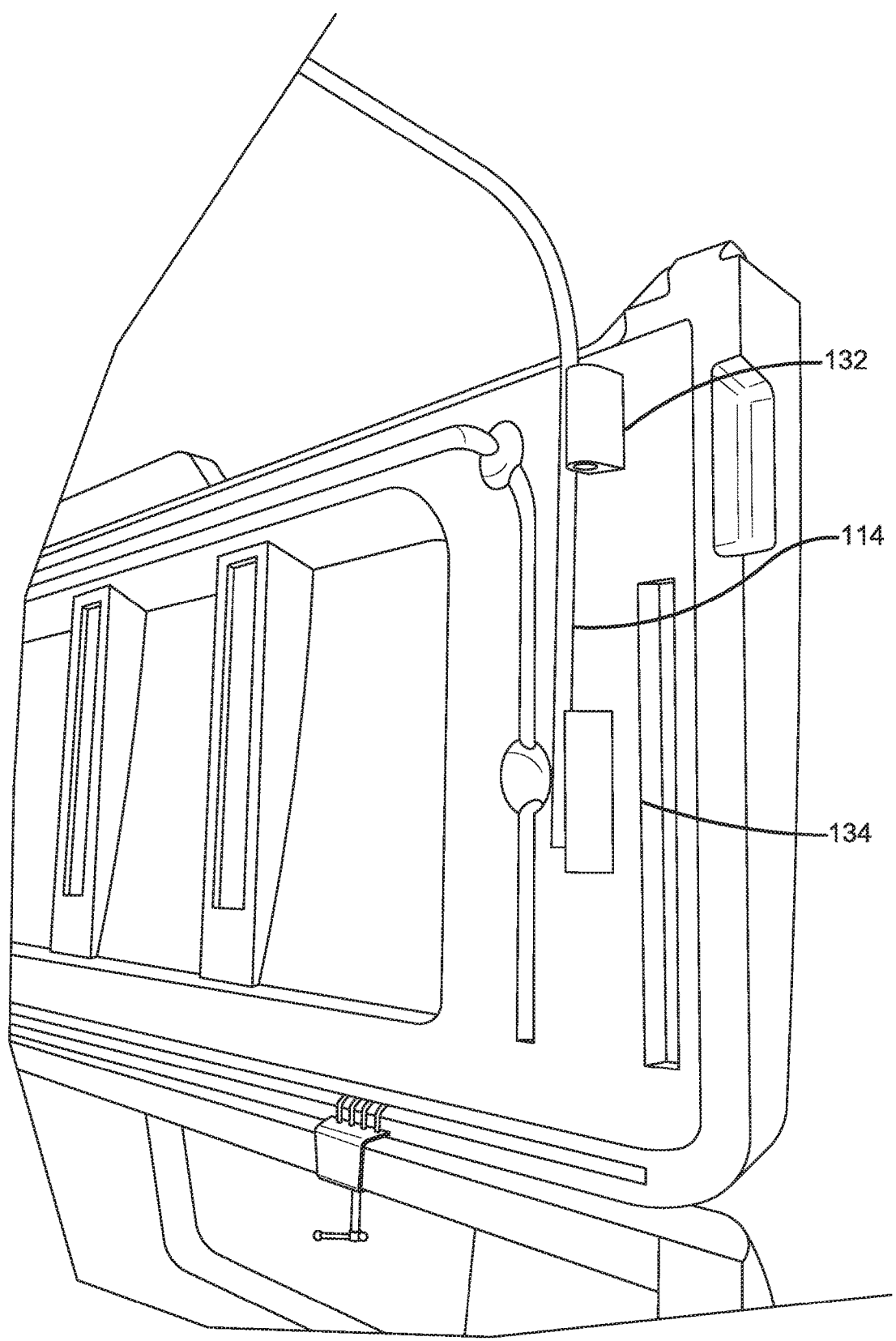
Figure 31:
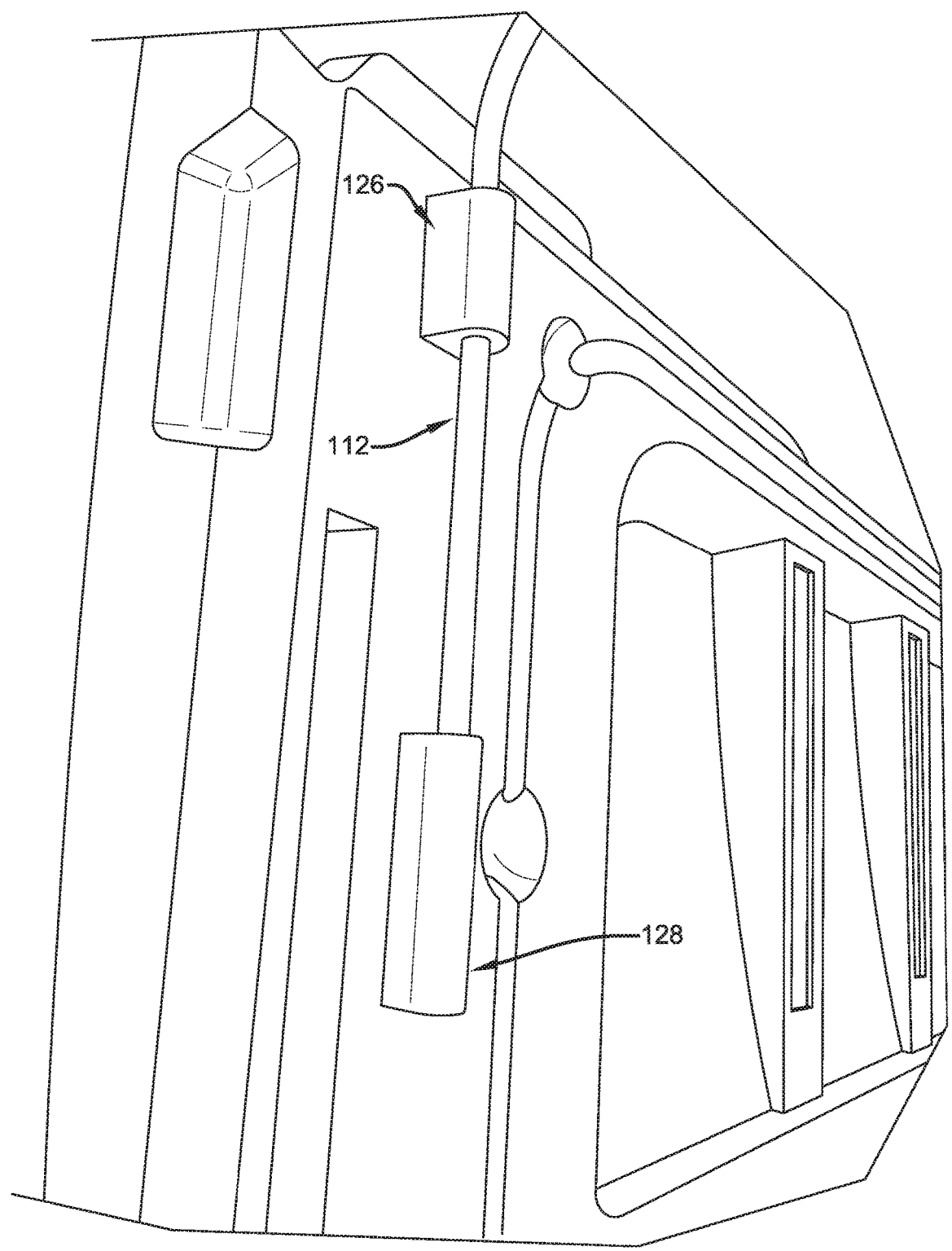
Figure 32:
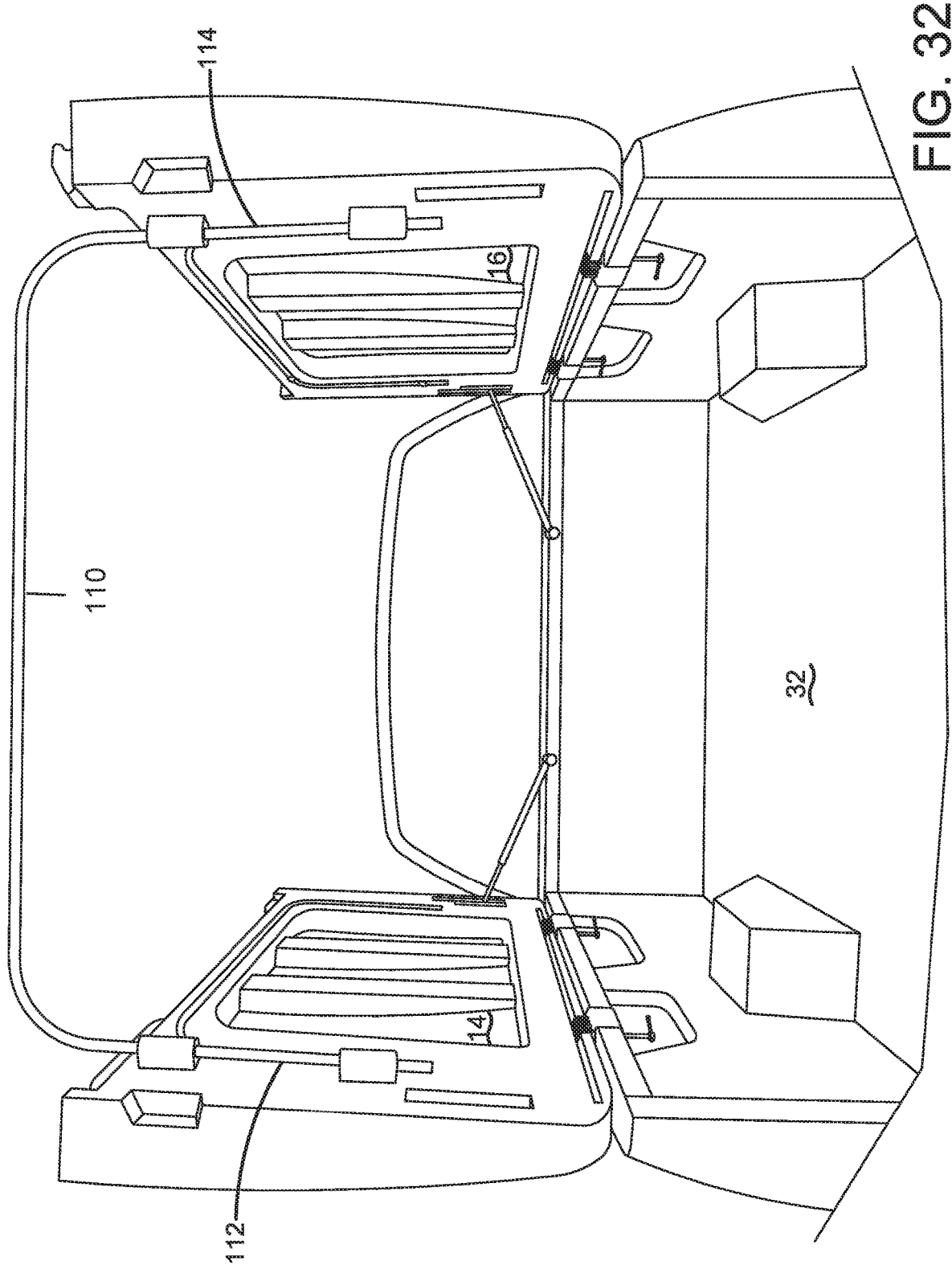
Figure 33:
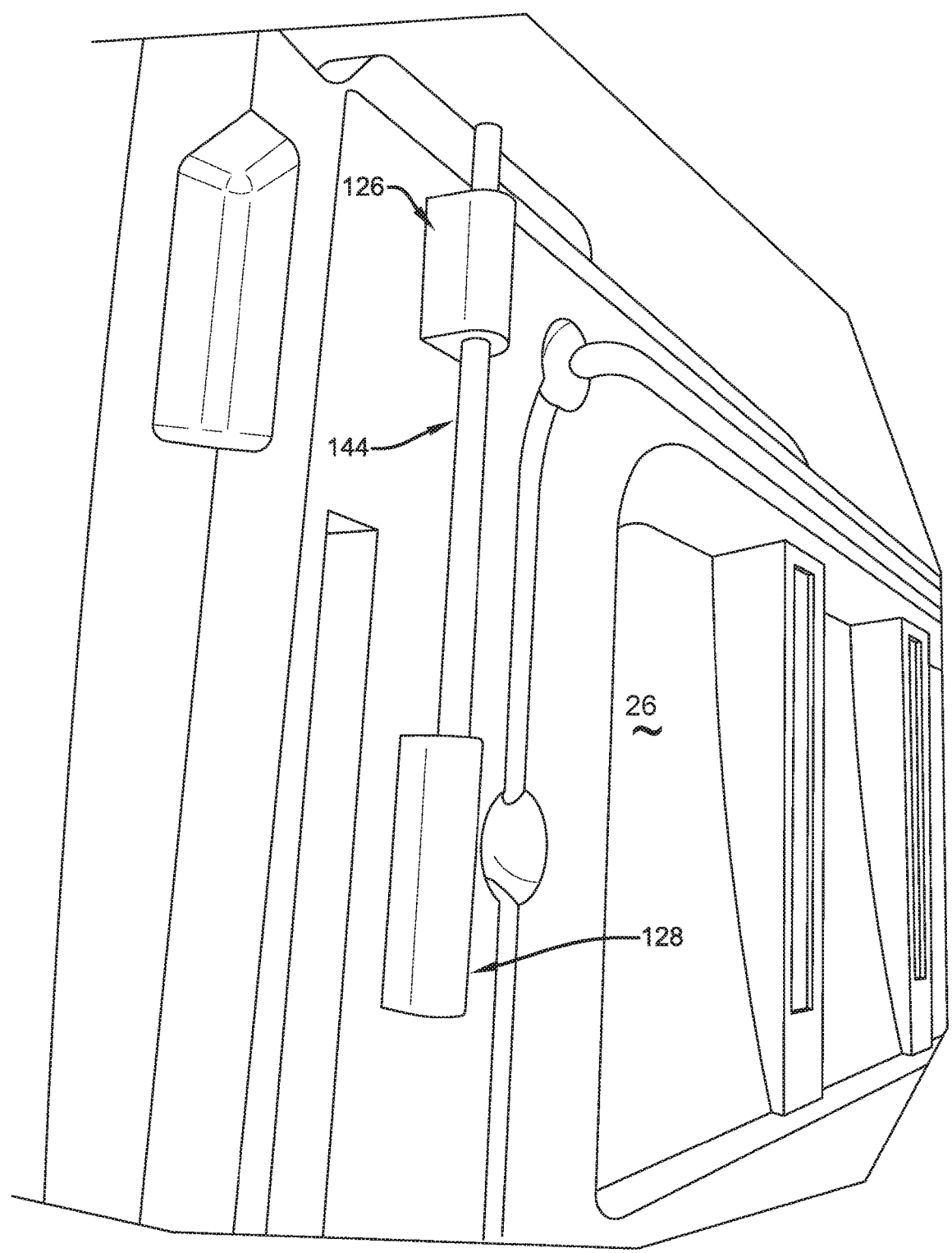

FIG. 6 is a schematic perspective view of a top surface 18 of a first member 14 of the article 10;

FIG. 7 is a top view of the first member 14 showing the top surface 18 of the first member 14;

FIG. 8 is a perspective schematic view of the bottom surface 26 of the first member 14;

FIG. 9 shows the bottom surface 28 of the second member 16;

FIG. 10 shows the bottom surface 26 of the first member 14;

FIG. 11 is a perspective schematic view of a first member 14 and a second member 16 in an operative open arrangement attached to an associated truck bed 32;

FIG. 12 is a perspective, end view of the article 20 mounted on an associated pickup truck bed with first member 14 and second member 16 in operative arrangement, closing over the associated truck bed;

FIG. 13 shows a hold-down device 40, which selectively secures first or second members to the associated truck bed;

FIG. 14 shows the hold-down device 40 attached to the second member 16 and not yet attached to the associated truck bed;

FIG. 14A shows the method of selectively attaching the article 10 to the associated pickup truck bed 32;

FIG. 15 is an end view of an associated pickup truck bed with the article 10 being fitted and centered to the truck bed;

FIG. 16 is a top perspective view of an associated truck bed with the second member 16 mounted to the truck bed but the first member 14 (not shown) not yet fitted or mounted to the associated truck bed;

FIG. 17 is a perspective view of the first member 14 and a hold-down device 40 being carried to the associated pickup truck bed to be matched with the second member 16 as shown in FIG. 16;

FIG. 18 is a top schematic view of a portion of the associated pickup truck bed 32 showing a driver's side top edge 54, a passenger side top edge 56, and a front top edge 58, on to which a front brace 50 fits;

FIG. 19 is a top view of a driver's side portion of the front brace 50;

FIG. 20 shows a side view of the passenger top side edge 56 of the associated pickup truck bed with the passenger side 62 of the front brace 50 including projections 72 mounted thereto;

FIG. 21 shows a first support strut shown in a non-functional location, simply laying on the associated tailgate 84 of the associated pickup truck;

FIG. 22 shows a first end 88 of the first support strut 80;

FIG. 23 shows a bottom surface 28 of second member 16 and a securement block 98 into which is a projection 72;

FIG. 24 is a top perspective view of a securement block 96 showing a projection 72, with the securement block 98 mounted on the bottom surface 28 of second member 16;

FIG. 25 shows the bottom surface 28 of the second member 16 with a securement block 98 and associated projection 72 mounted in location;

FIG. 26 is a top perspective view from the rear of the associated pickup truck bed showing the first member 14 in an upright position, and being held so by the first support strut, in place, with one end attached to a projection on the front brace 50 and another end attached to a projection on the hold-down device;

FIG. 27 is a close-up view of an end of the first support strut attached the securement block 98 via a projection 72;

FIG. 28 shows one embodiment of the article 10 showing the bottom surface 26 of a first member 14 with certain groove 102 created therein;

FIG. 29 is a close-up view of the rear portion of the bottom surface 26 of the first member 14 and the groove 102, showing a stabilizing member 110;

FIG. 30 is a rear perspective view of the bottom surface 28 of the second member 16 with the passenger side end 112 of the stabilizing member 110 aligned with upper and lower support sleeves 116, 118, respectively;

FIG. 31 shows a rear perspective view of the interior bottom surface 26 of the first member 14 with the driver's side upper support sleeve 126 and the driver's side lower support sleeve 128;

FIG. 32 is a rear view of the associated pickup truck bed 32 with the first member 14 and the second member 16 shown in an open position, being held open by first support strut 80 and second support strut 82 and by stabilizing member 110;

FIG. 33 shows a locking mechanism 140 with locking rod 144; and

Figure 34:
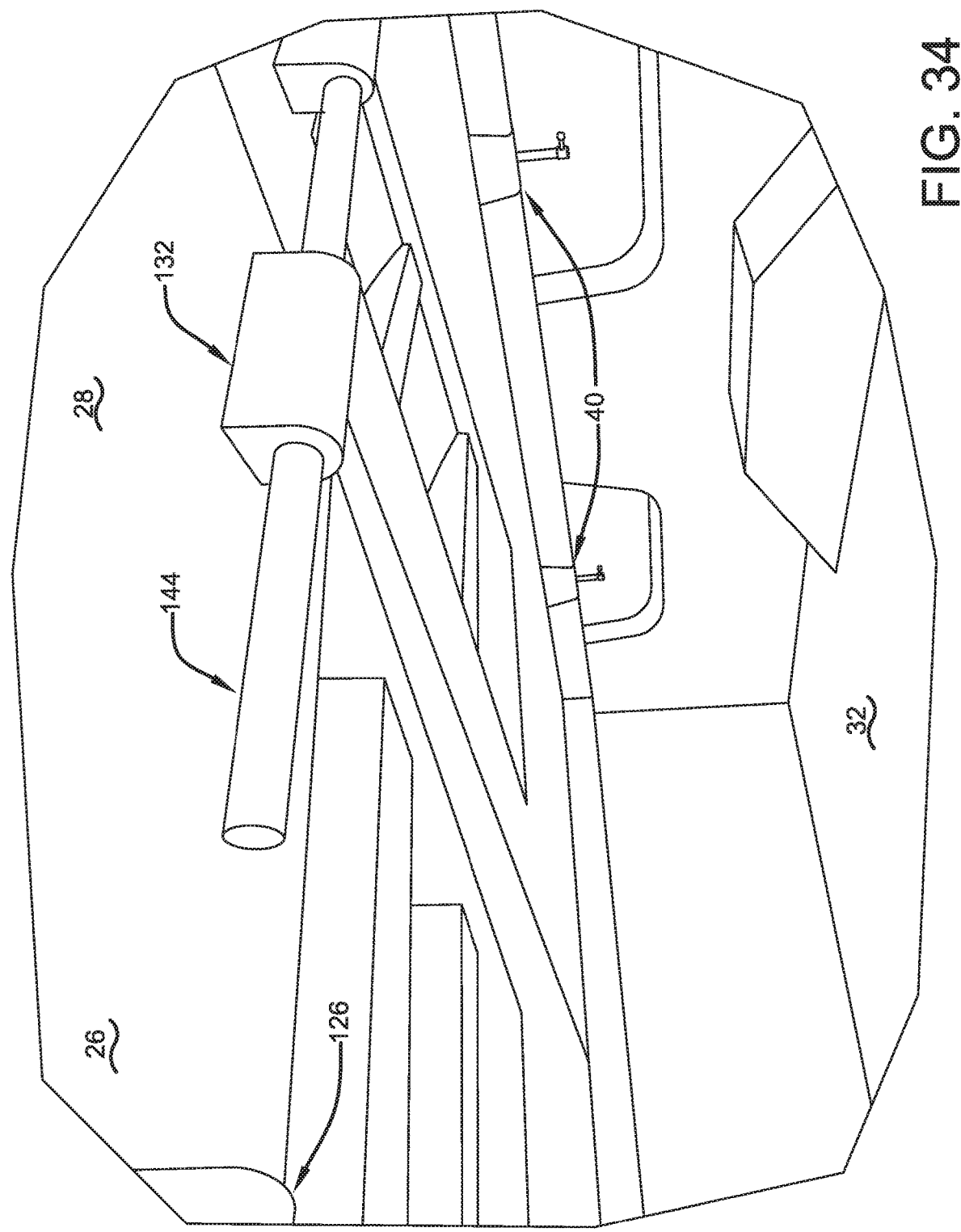

FIG. 34 shows a rear view of the locking mechanism 140 as the locking rod 144 is ready to be slid to the left, through the passenger side upper support sleeve 116 and into the driver's side upper support sleeve 126, thereby locking the first member 14 and the second member 16 together.

IV. DETAILED DESCRIPTION

Figure 1:
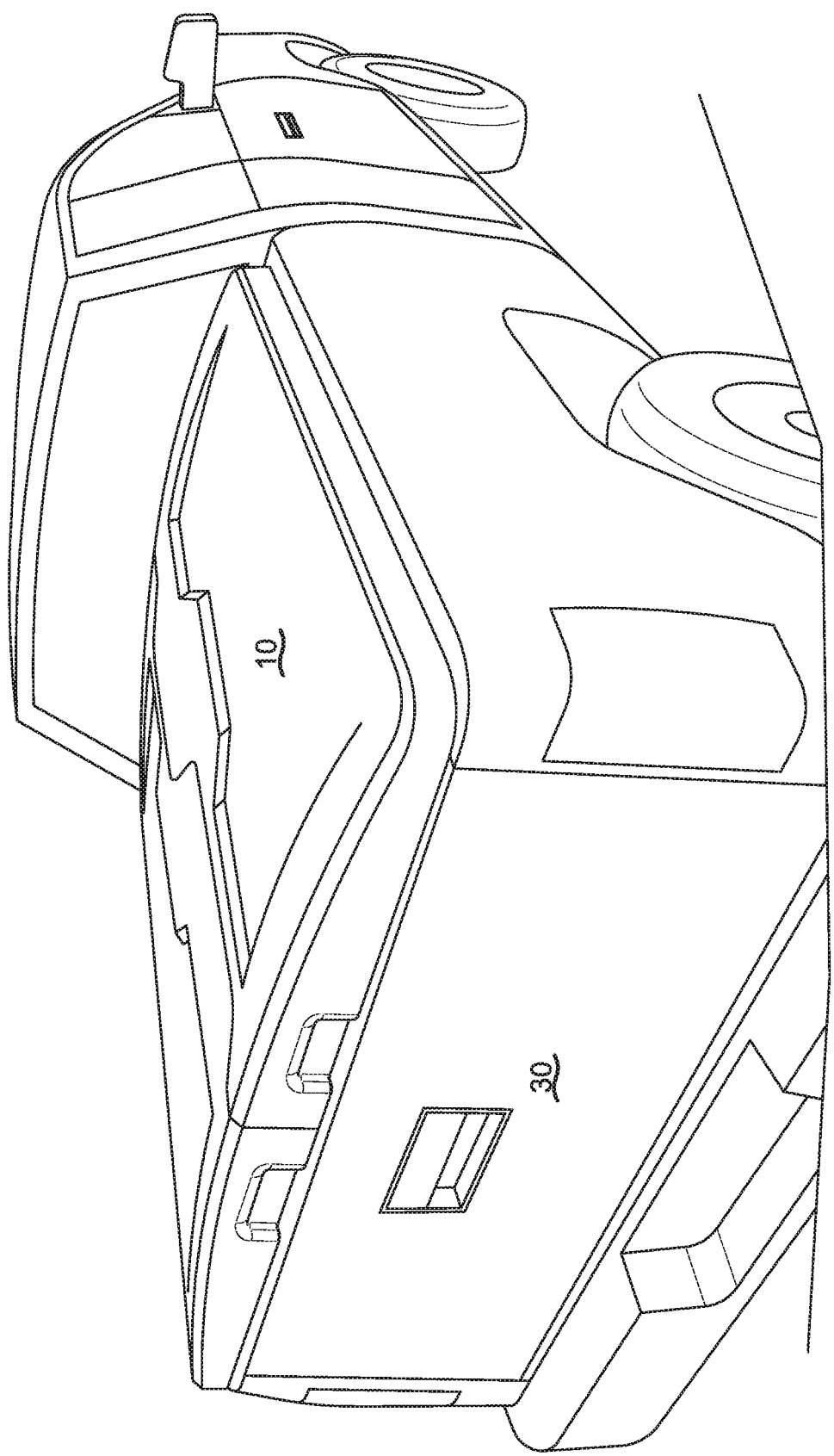
FIG. 1 is a perspective view of an associated pickup truck with the article mounted to the associated pickup truck bed and shown in the closed position.
Figure 2:
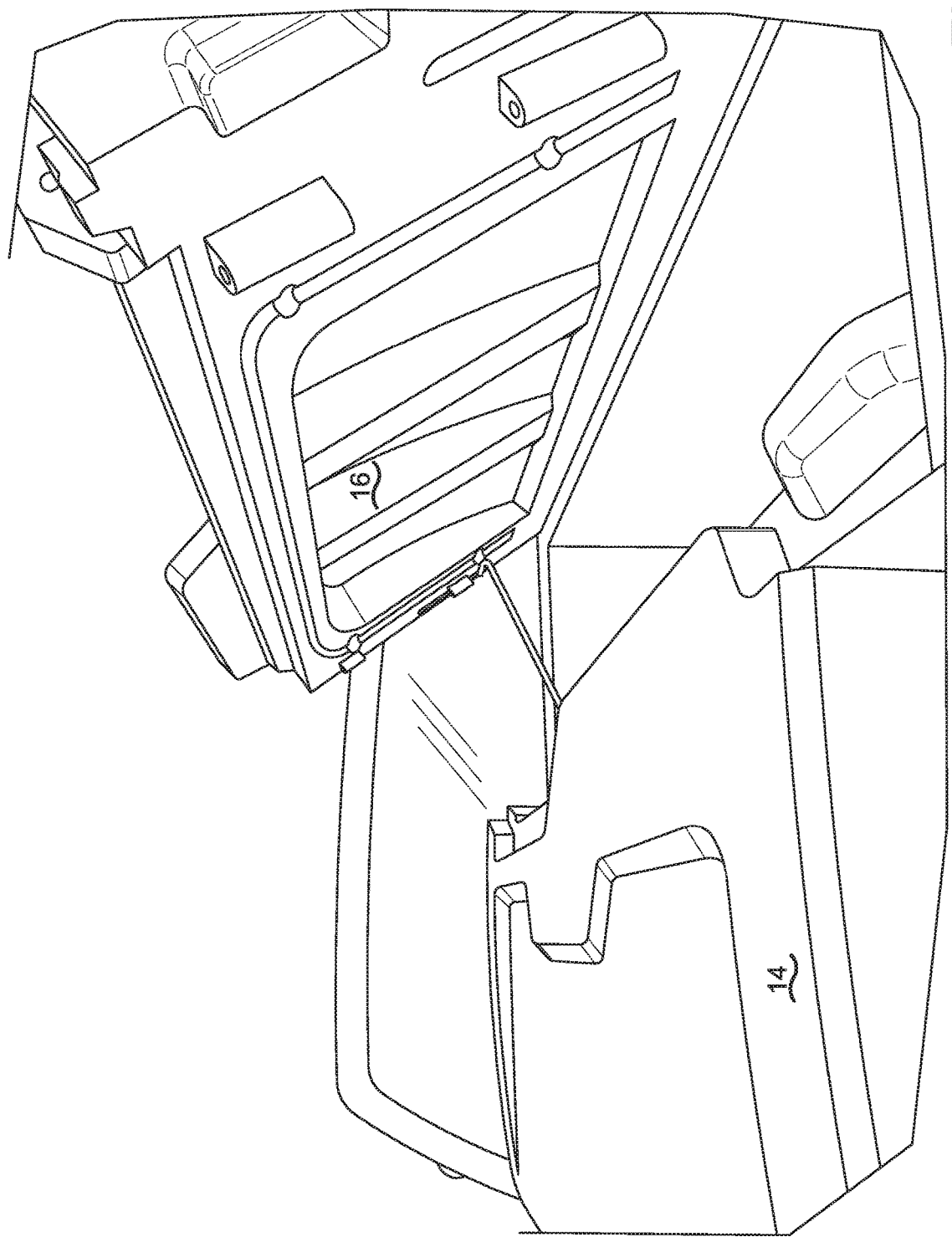
FIG. 2 is an end perspective view of the article mounted on to the associated bed of an associated pickup truck in a partially opened position.
Figure 3:
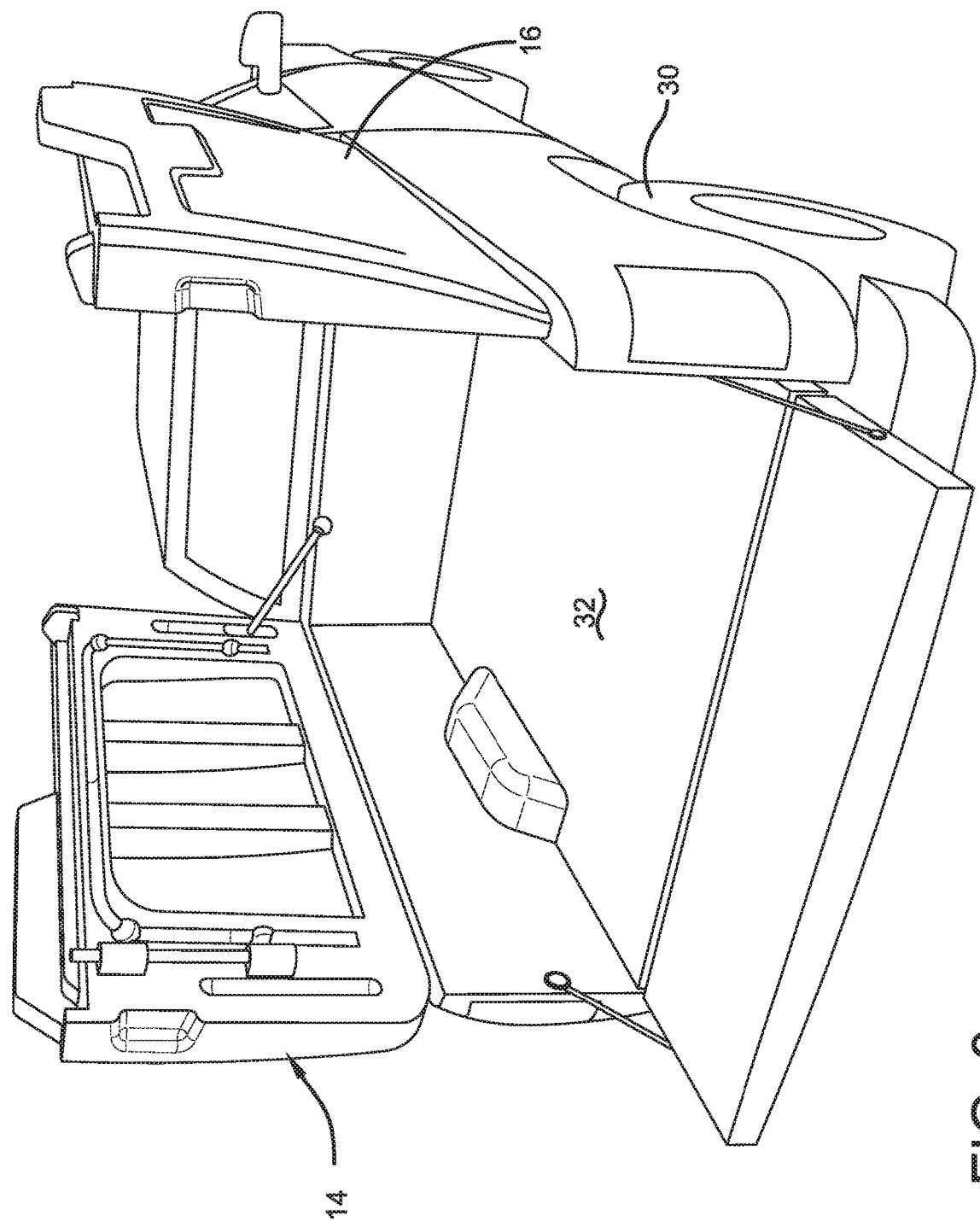
FIG. 3 is an end perspective view of the article shown mounted on to an associated pickup truck bed in the open position.
Figure 4:
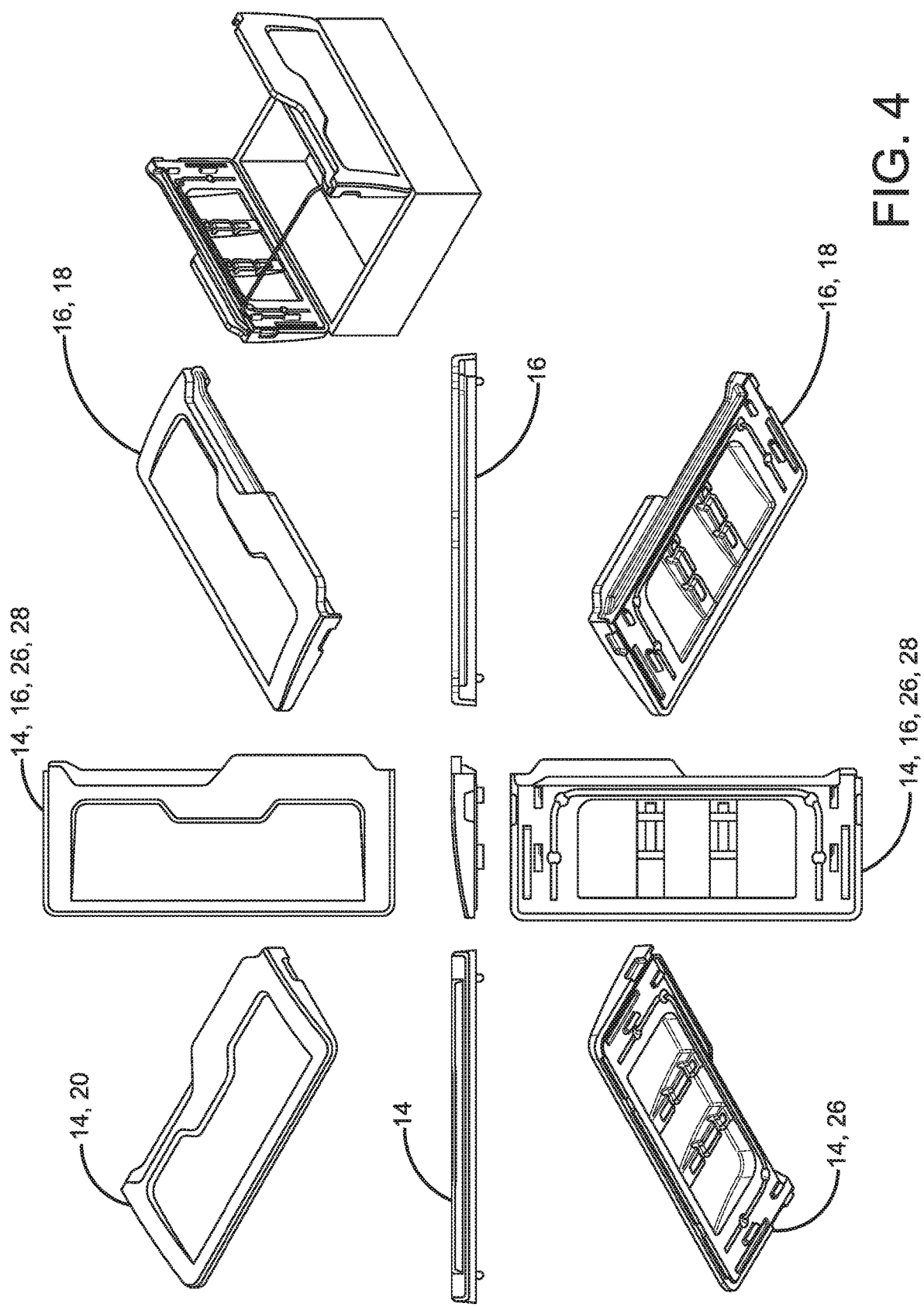
FIG. 4 is a schematic, exploded view showing alternate views of the article, including the first and second members, as well as a schematic illustration of the article mounted on to an associated bed of an associated pickup truck.

Referring now to the drawings wherein the showings are for purposes of illustrating embodiments of the invention only and not for purposes of limiting the same, and wherein like reference numerals are understood to refer to like components, with reference to FIGS. 1 through 4, the article 10 will be explained. The invention is article 10 and an innovative method for making same. The article 10 is a selectively removable and operational cap or cover, such as is often used with associated vehicles, such as a pickup truck 30. With reference to FIG. 2, the article 10 is shown in a semi-open position, where a first member 14 is shown in a closed position while a second member 16 is shown in a semi-open position. With reference to FIG. 13, the article 10 is shown in an open position where both first member 14 and second member 16 are both fully open. With reference to FIG. 4, some of the components of the article 10 are displayed. In FIG. 4, the top surface 18 of the first member 14 and the top surface 20 of the first member 14, as well as the bottom surface 26 of the first member 14 and the bottom surface 28 of the second member 16 are illustrated.

Figure 5:
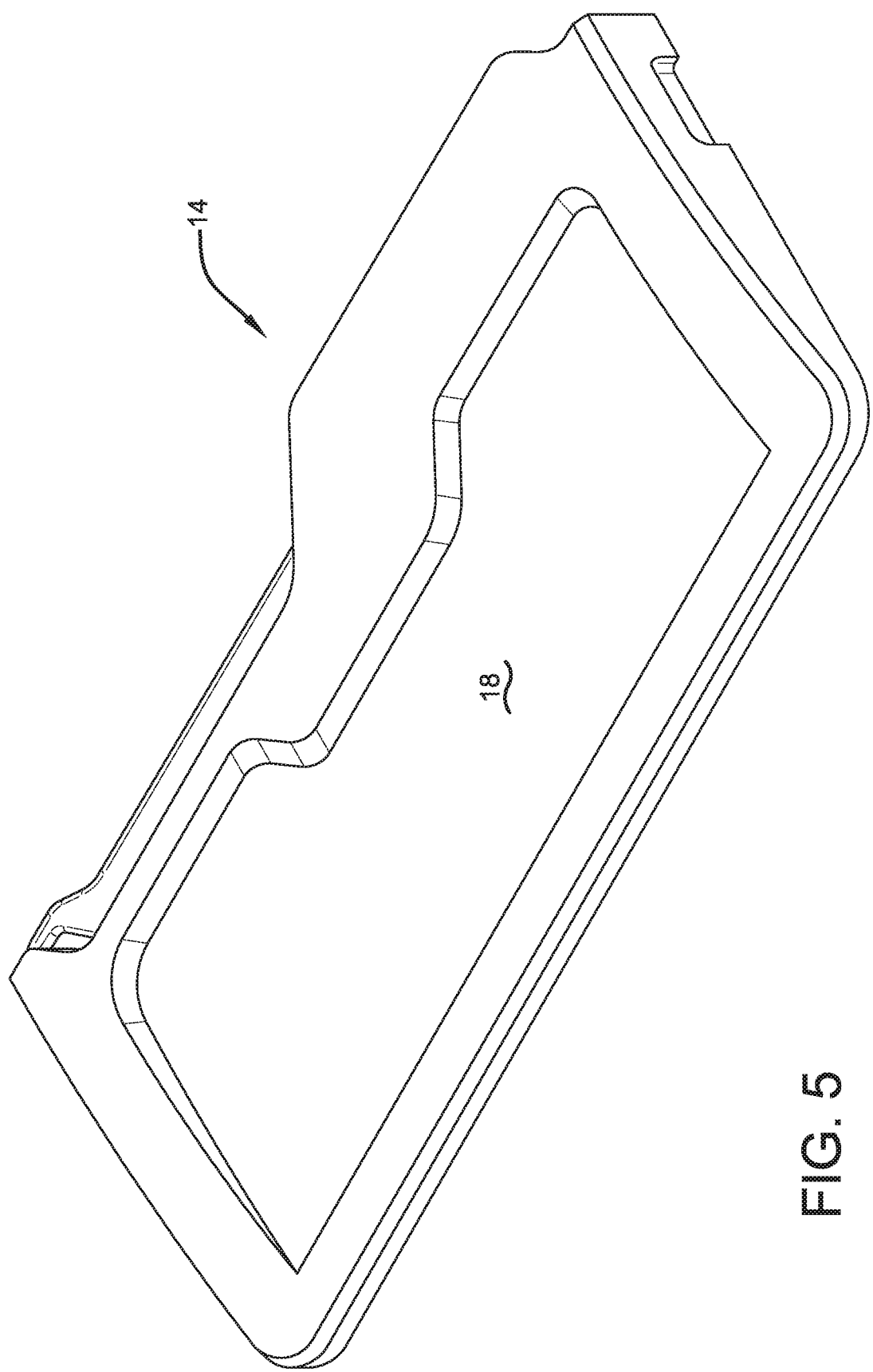
FIG. 5 is a perspective view of a first member 14 of the article 10.

With reference to FIGS. 6-8, the top surface 20 of the first member 14 is illustrated. FIG. 6 shows a top surface 18 of the first member 14. FIG. 7 shows the same view in a line drawing. FIG. 8 shows a bottom surface 26 of the first member 14. With reference to FIG. 5, a perspective view of the first member 14 is shown, especially showing the top surface 18 of first member 14.

With reference to FIG. 6, a similar perspective view is shown of the second member 16 with its top surface 20. Importantly, the first member 14 and second member 16 are identical and can be operatively fitted together as will be described later. Because the first member and second member are identical, the same mold can make both first member 14 and second member 16. With reference to FIG. 7, a line drawing of first member 14 and its top surface 18 is shown. Similarly, in FIG. 8, a perspective view of the bottom surface 26 of the first member 14 is shown. With reference to FIG. 9, a perspective view of the bottom surface 28 of the second member 16 is shown. With reference to FIG. 10, a line drawing of the second member 16 and its bottom surface 28 is shown.

With reference to FIG. 11, the article 10 is shown with the first member and the second member in an open position. An associated pickup bed 32 is shown in a schematic form. In this view, one can see how the first member 14 and the second member 16 fit together in that an extension 14A on first member 14 is selectively, operatively engageable with a recess 16B on second member 16. Similarly, an extension 16A on second member 16 is selectively, operatively engageable with a recess 14B on first member 14.

With reference to FIG. 12, the first member and second member are shown in the closed position where the extension 14A is received into the recess 16B and the extension 16A is received into the recess 14B. Importantly, as is illustrated in the FIGURES, this closed relationship can be modified (as shown in FIGS. 1-2) selectively open and close the article 10, thereby giving access to the associated truck bed 32 of the associated of the associated pickup truck 30.

With reference to FIGS. 13 and 14, a hold-down device 40 is shown in operative engagement, holding the second member 16 of the article 10 and attaching it to a passenger side edge 56 of the associated truck bed 32. The hold-down device can take various forms but in the current form, it has the configuration of a C-shaped metal bracket which features a threaded rod 42 which can be advanced to tighten or loosen the hold-down device 40 to the truck bed 32 as desired.

With reference to FIG. 14A, the method of selectively attaching the article 10 to the associated pickup truck bed 32 as illustrated. Once the article 10 is generally centered over the truck bed, an associated operator or driver can enter the truck bed and tighten the threaded rod 42 on each of the first and second member 14, 16, thereby making fine adjustments of centering and securing the article to associated pickup truck 30.

With reference to FIG. 15, the second member 16 is shown in attached position on the associated pickup truck 30. With reference to FIG. 16, the first member 14 is shown being carried by an associated operator to the driver's side edge 54 of the associated pickup truck bed 32. When the associated operator fits the first member 14 into place, causing the extension 14A to align with recess 16B, and recess 14B to align with extension 16A, the first member will be in operative association with the second member, requiring only for the operator to tighten the hold-down device 40 via the threaded rods 42, as illustrated in FIG. 14A.

With reference to FIGS. 17-20, a front brace is illustrated. The front brace 50 selectively fits at the front end of the associated pickup truck bed 32. As shown schematically in FIG. 17, the front brace is generally U-shaped with the driver's side leg 152 and the passenger side leg 154 begin considerably shorter than the center portion 156. As can be seen in FIGS. 18 and 19, the front brace 50 fits, preferably with a press fit, into the front portion of the associated truck bed 32. The length of the center portion 156 is slightly larger than the width of the associated truck bed 32 so that the front brace fits snugly in its place. As is best shown in FIG. 20, the primary purpose of the front brace 50 is to provide a place for projection 72 to be mounted.

As can be seen best in FIGS. 20-27, the projections 72 provide an anchor on the front brace 54 whereby to operatively link and attach first and second support struts 80, 82. With continuing reference to FIGS. 20-27, as well as to FIG. 3, the first and second support struts 80, 82, are the same, but the one associated with each side of the associated truck bed 32 and facilitating the easy opening and closing of the first and second members 14, 16. With specific reference to FIG. 21, a first and second support strut 80, 82, is illustrated. Each support strut 80, 82 has a first end 88 which is shown in more detail in FIG. 22. The first end 88 can operatively engage the projections 72. As discussed previously, one set of projections 72 are mounted onto the front brace 50. A corresponding set of projections are mounted onto a securement block 98. The securement block 98 is attached to the bottom surfaces 26, 28 of the first and second members 14, 16, respectively. With reference to FIG. 26, the first support strut 80 with respective first end 88 and second end 90 can be seen in operative association with the front brace 50, the bottom surface 26 of the first member 14, the interior driver's side edge 78 of the associated truck bed 32 and securement block 98.

With reference to FIGS. 28-34, another aspect of the invention will be described. With reference to FIG. 28, a stabilizing member 110 is shown. The stabilizing member has a generally U-shape. A driver's side leg 112 of the stabilizing member 110 is essentially the same length as passenger side leg 114. The driver's side leg 112 and the passenger side leg 114 are joined by a center portion 116 of the stabilizing member 110.

With reference to FIGS. 28-32, the operation and use of the stabilizing member 110 will be illustrated. The stabilizing member can be easily removed from the bottom surface 26 of the first member 14 by use of the cutouts 122. As is shown best in FIGS. 30-32, the driver's side leg 112 of the stabilizing member 110 is selectively fitted into driver's side upper support sleeve 126 and driver's side lower support sleeve 128. Similarly, the passenger side leg 114 of the stabilizing member 110 is selectively threaded into the passenger side upper support sleeve 132 and the passenger side lower support sleeve 134. With reference to FIG. 32, the stabilizing member 110 is shown in its "locked" or "open" position so that the article 10 is shown in its open position. In this configuration, both the first member 14 and the second member 16 are open and are kept open by the stabilizing member 110. In such configuration, the associated vehicle, such as a pickup truck 30 can be driven with a larger, taller load in the associated pickup truck bed 32. For example, an all-terrain vehicle (commonly known as an "ATV") or something that extends upwardly above the driver's side edge and passenger side edge 54, 56, respectively of the associated truck bed 32 can be carried.

With reference to FIGS. 33 and 34, the locking mechanism for the article 10 will be illustrated. Previously, the driver's side upper support sleeve 126 and driver's side lower support sleeve 128 as well as the passenger side upper support sleeve 132 and the passenger side lower support sleeve 134 were discussed. Also shown in FIG. 33 is a locking rod. In the currently preferred embodiment, the locking rod is simply a wooden rod approximately 18 inches in length and about 1 inch in diameter. The locking rod 144 is stored in either of the upper or lower support sleeves 126, 128, 132, 134 when not in use. When the pickup truck bed 32 is preferably locked, and therefore the article 10 is desired to be secured so that the content inside the truck bed can also be secured, the first member 14 and the second member 16 are closed, as in the configuration shown in FIG. 12. Then, as shown in FIG. 34, the locking member 140 is slid so that it engages both the driver's side upper support sleeve 126 and the passenger side upper support sleeve 132, thereby preventing the first member 14 and the second member 16 from being opened, as is illustrated in several FIGURES, such as FIG. 32, Once the locking rod 144 is in place, and the first and second members 14, 16 are locked together thereby, and the first and second members are locked to the associated pickup truck 30 via the hold-down devices 40, the only access to the pickup truck bed 32 is the associated pickup truck tailgate 150, as illustrated in FIG. 14A and FIG. 15. Nearly all associated pickup trucks have a locking mechanism for the tailgate, and so when the tailgate 150 is locked in this conventional way, access to the associated pickup truck bed 32 is secured and controlled.

According to another aspect of the invention, the innovative article 10 is manufactured through a known manufacturing technique called rotational molding. It is well-known in the art to make certain products through a rotational molding procedure. However, heretofore, a truck cap, such as the article 10, has never been made by a rotationally molded process. The features of the article 10, such as the indentations, cutouts, and configurations of the bottom surfaces 26, 28 of the first and second members 14, 16 are well-suited to the rotational molding process. The low weight (as demonstrated by the user carrying the first member 14 shown in FIG. 16) makes the article 10 and its respective parts first member 14 and second member 16 light enough to enable the user to assemble and disassemble the article and mount and dismount the article 10 from the associated pickup truck bed 32. The material used (plastic) and the manufacturing process (rotational molding) provide the hollow, double-walled, lightweight construction of the article enabling it to have sufficient strength and toughness for the difficult environment in which it operates while still being light enough to be assembled and disassembled, and mounted and dismounted by a single person.

Numerous embodiments have been described, hereinabove. It will be apparent to those skilled in the art that the above methods and apparatuses may incorporate changes and modifications without departing from the general scope of this invention. It is intended to include all such modifications and alterations in so far as they come within the scope of the appended claims or the equivalents thereof.

I claim:

1. An article for selectively mounting onto an associated pick-up truck bed, said article comprising:
   a) a first member; said first member having a top surface and a bottom surface; said bottom surface having cut-outs, said first member being rotationally molded; said first member having a first extension and a first recess; said first member being moveable from a first closed position to a second open position;
   b) a second member; said second member having a top surface and a bottom surface; said bottom surface having cut-outs, said second member being rotationally molded; said second member being moveable from a first closed position to a second open position; said second member having a first extension and a first recess; when in said second closed position said first extension of said first member operatively cooperating with said first recess of said second member, and said first recess of said first member operatively cooperating with said first extension of said second member to thereby secure said first and second members in a closed position, thereby covering and closing the associated truck bed; said first and second members having the same configuration and able to be molded from a single rotational molding mold;
   c) a hold-down device; said hold-down device having a generally U-shaped configuration and capable of selectively securing said article to an associated edge of an associated side wall of the associated pick-up truck; said hold-down device having a threaded rod, the turning of which selectively secures the first member to the associated side wall of the associated pick-up truck;
   d) a front brace; said front brace having a generally U-shape and being mounted to a front end of the associated pick-up truck bed; said front brace having a first projection attached thereto; said first projection configured to receive a first end of a first support strut;

e) a securement block; said securement block mounted to said bottom surface of said first member; said securement block having a second projection attached thereto; said second projection configured to receive a second end of said first support strut; said support strut supporting the moving of said first member from the first closed position to the second open position;

f) a stabilizing member; said stabilizing member selectively securing said first and said second member in said second open position; and, g) a locking mechanism; said locking mechanism comprising a locking rod that is moveable from a first unlocked position to a second locked position; when in said first unlocked position said locking rod being moveably located in an upper support sleeve mounted onto said bottom surface of said first member, and when said locking mechanism is in said second locked position said locking rod is located in said upper support sleeve mounted onto said bottom surface of said first member, and also in an upper support sleeve mounted onto said bottom surface of said second member.

2. An article for selectively mounting onto an associated pick-up truck bed, said article comprising:

a) a first member; said first member being rotationally molded; said first member being moveable from a first closed position to a second open position;

b) a second member; said second member being rotationally molded; said second member being moveable from a first closed position to a second open position;

c) said first member and said second member operatively fitting together when in said first closed position to enclose the associated pick-up truck bed;

wherein said first member has a first extension and a first recess; and said second member has a first extension and a first recess; and when in said second closed position said first extension of said first member operatively cooperates with said first recess of said second member, and said first recess of said first member operatively cooperating with said first extension of said second member to thereby secure said first and second members in a closed position, thereby covering and closing the associated truck bed.

3. The article of claim 2 wherein said first and second members have the same configuration and can be molded from a single rotational molding mold.

* * * * *